United States Patent
Lundgren et al.

(10) Patent No.: US 9,737,839 B2
(45) Date of Patent: Aug. 22, 2017

(54) AEROSOL SEPARATOR ASSEMBLY; COMPONENTS; AND, METHODS

(71) Applicant: Donaldson Company, Inc., Minneapolis, MN (US)

(72) Inventors: Thomas John Lundgren, Bloomington, MN (US); Bradley Hemish, Coon Rapids, MN (US); Daniel Adamek, Bloomington, MN (US); Wade Mosset, Savage, MN (US)

(73) Assignee: Donaldson Company, Inc., Minneapolis, MN (US)

(*) Notice: Subject to any disclaimer, the term of this patent is extended or adjusted under 35 U.S.C. 154(b) by 655 days.

(21) Appl. No.: 14/273,801

(22) Filed: May 9, 2014

(65) Prior Publication Data

US 2014/0245705 A1  Sep. 4, 2014

Related U.S. Application Data

(63) Continuation of application No. 12/450,244, filed as application No. PCT/US2008/057493 on Mar. 19, 2008, now Pat. No. 8,758,467.

(60) Provisional application No. 60/919,254, filed on Mar. 20, 2007.

(51) Int. Cl.

| B01D 46/42 | (2006.01) |
|---|---|
| B01D 46/00 | (2006.01) |
| B01D 46/24 | (2006.01) |
| F01M 13/04 | (2006.01) |

(52) U.S. Cl.
CPC ..... *B01D 46/4227* (2013.01); *B01D 46/0004* (2013.01); *B01D 46/0005* (2013.01); *B01D 46/009* (2013.01); *B01D 46/0031* (2013.01); *B01D 46/0087* (2013.01); *B01D 46/2414* (2013.01); *F01M 13/04* (2013.01);
(Continued)

(58) Field of Classification Search
None
See application file for complete search history.

(56) References Cited

U.S. PATENT DOCUMENTS

| 3,164,141 A | 1/1965 | Jones |
|---|---|---|
| 4,011,846 A | 3/1977 | Gagliardi |
| 4,233,042 A | 11/1980 | Tao |

(Continued)

FOREIGN PATENT DOCUMENTS

| WO | WO 99/47211 | 9/1999 |
|---|---|---|
| WO | WO 02/076575 | 10/2002 |

(Continued)

OTHER PUBLICATIONS

Allowed Claims of U.S. Appl. No. 12/450,244 dated May 9, 2014.

*Primary Examiner* — Amber R Orlando
*Assistant Examiner* — Phillip Shao
(74) *Attorney, Agent, or Firm* — Merchant & Gould P.C.

(57) ABSTRACT

A filter cartridge for use in separating a hydrophobic liquid aerosol phase from a gas stream, as a crankcase ventilation filter for example, is described. The cartridge includes a media pack comprising filtration media surrounding an open interior and a first end piece. Various structure included on the first end piece is described. An example is a D-shaped projection. Also described is an assembly including the filter cartridge, specific features of a housing component of the assembly. Methods of assembly and use are also described.

18 Claims, 23 Drawing Sheets

(52) U.S. Cl.
CPC .. *B01D 2265/026* (2013.01); *B01D 2265/028* (2013.01); *F01M 2013/0438* (2013.01)

(56) References Cited

U.S. PATENT DOCUMENTS

| | | | |
|---|---|---|---|
| 4,272,368 | A | 6/1981 | Foord et al. |
| 5,605,555 | A | 2/1997 | Patel et al. |
| 5,853,439 | A | 12/1998 | Gieseke et al. |
| 5,855,783 | A | 1/1999 | Shucosky et al. |
| 6,093,231 | A | 7/2000 | Read et al. |
| 6,136,076 | A | 10/2000 | Read |
| 6,143,049 | A | 11/2000 | Gieseke et al. |
| 6,187,073 | B1 | 2/2001 | Gieseke et al. |
| 6,485,535 | B1 | 11/2002 | Linnersten et al. |
| 6,530,969 | B2 | 3/2003 | Gieseke et al. |
| 6,572,667 | B1 | 6/2003 | Gieseke et al. |
| 6,647,973 | B1 | 11/2003 | Schueler et al. |
| 6,752,924 | B2 | 6/2004 | Gustafson et al. |
| 6,852,148 | B2 | 2/2005 | Gieseke et al. |
| 6,907,869 | B2 | 6/2005 | Burgess et al. |
| 6,936,084 | B2 | 8/2005 | Schlensker et al. |
| 6,958,083 | B1 | 10/2005 | Schmitz et al. |
| 7,081,145 | B2 | 7/2006 | Gieseke et al. |
| 7,182,804 | B2 | 2/2007 | Gieseke et al. |
| 7,309,372 | B2 | 12/2007 | Kahlbaugh et al. |
| 7,531,018 | B2 | 5/2009 | Becker et al. |
| D601,238 | S | 9/2009 | Lundgren et al. |
| 7,662,216 | B1 | 2/2010 | Terres et al. |
| D636,859 | S | 4/2011 | Lundgren et al. |
| 7,955,502 | B2 | 6/2011 | Greco et al. |
| 8,119,002 | B2 | 2/2012 | Schiavon et al. |
| 8,177,875 | B2 | 5/2012 | Rogers et al. |
| 8,177,976 | B2 | 5/2012 | Formica |
| 8,182,569 | B2 | 5/2012 | Read et al. |
| 8,758,467 | B2 | 6/2014 | Lundgren et al. |
| 2002/0170279 | A1 | 11/2002 | Gustafson et al. |
| 2003/0037520 | A1 | 2/2003 | Sakagami et al. |
| 2003/0051455 | A1 | 3/2003 | Gieske et al. |
| 2004/0035097 | A1 | 2/2004 | Schlensker et al. |
| 2004/0139734 | A1 | 7/2004 | Schmeichel et al. |
| 2005/0178713 | A1* | 8/2005 | Stockbower ......... B01D 29/114 210/437 |
| 2005/0193694 | A1 | 9/2005 | Gieseke et al. |
| 2005/0211232 | A1 | 9/2005 | Dushek et al. |
| 2006/0086075 | A1 | 4/2006 | Scott et al. |
| 2006/0123744 | A1 | 6/2006 | Read et al. |
| 2007/0084157 | A1 | 4/2007 | Heilkamp et al. |
| 2007/0157589 | A1 | 7/2007 | Haberkamp et al. |
| 2008/0035103 | A1 | 2/2008 | Barris et al. |
| 2008/0245717 | A1 | 10/2008 | Heikamp |
| 2008/0257161 | A1 | 10/2008 | Read |
| 2009/0071111 | A1 | 3/2009 | Lundgren et al. |
| 2009/0183717 | A1 | 7/2009 | Gillenberg et al. |
| 2010/0031940 | A1 | 2/2010 | Mosset et al. |
| 2010/0154371 | A1 | 6/2010 | Bittle et al. |
| 2010/0218682 | A1 | 9/2010 | Hammerschick |
| 2011/0030629 | A1 | 2/2011 | Schleiden |
| 2011/0108014 | A1 | 5/2011 | Schleiden et al. |
| 2011/0154790 | A1 | 6/2011 | Read |
| 2011/0258975 | A1 | 10/2011 | Lundgren et al. |

FOREIGN PATENT DOCUMENTS

| | | |
|---|---|---|
| WO | WO 2004/045743 | 6/2004 |
| WO | WO 2005/082488 | 9/2005 |
| WO | WO 2005/105266 | 11/2005 |
| WO | WO 2006/050114 | 5/2006 |
| WO | WO 2006/084282 | 8/2006 |
| WO | WO 2007/009040 | 1/2007 |

* cited by examiner

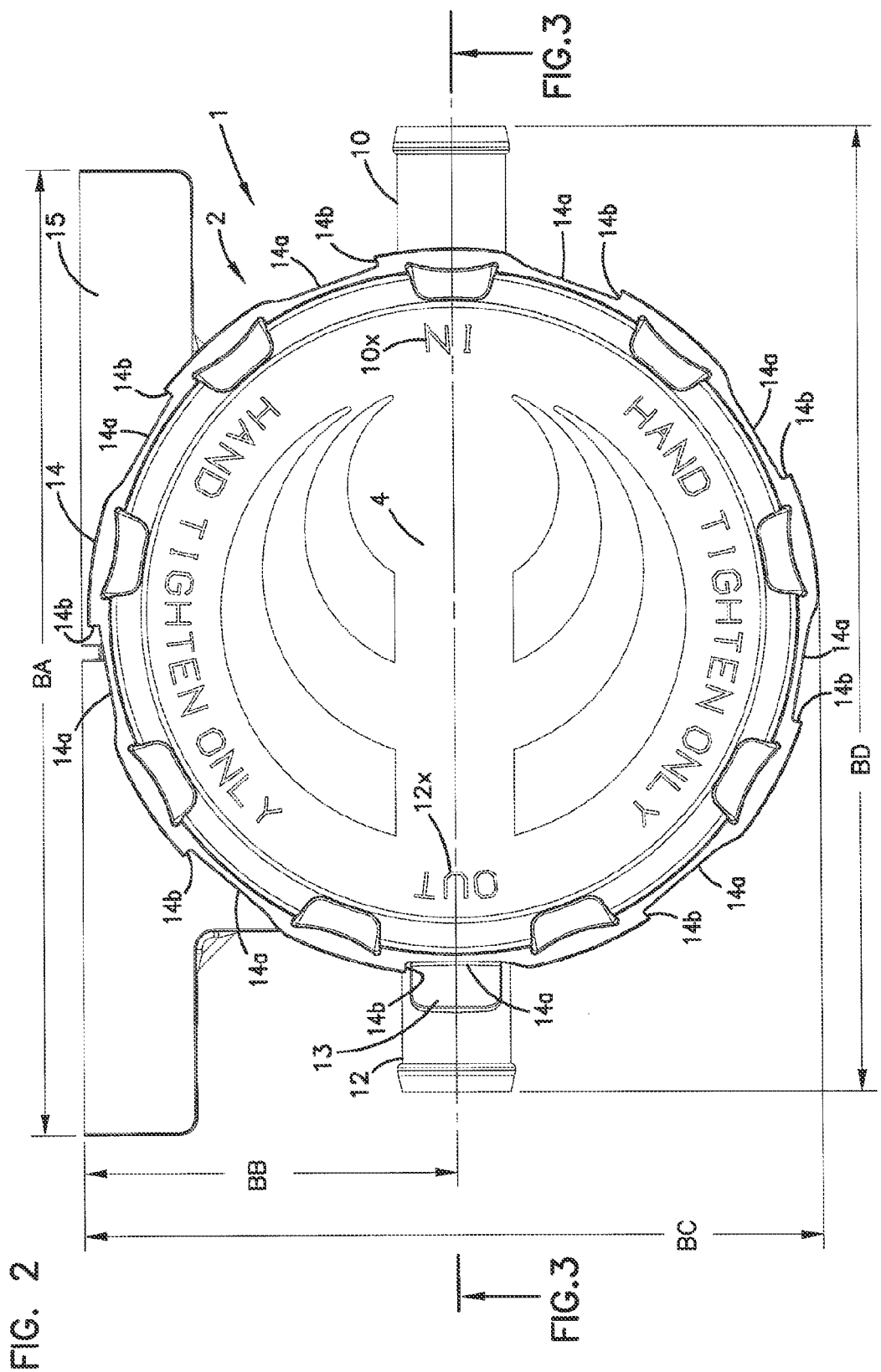

AEROSOL SEPARATOR ASSEMBLY; COMPONENTS; AND, METHODS

CROSS-REFERENCE TO RELATED APPLICATIONS

This application is a continuation of U.S. Ser. No. 12/450,244, filed Feb. 18, 2011 which issued as U.S. Pat. No. 8,758,467 on Jun. 24, 2014. U.S. Ser. No. 12/450,244 was filed as a National Stage of PCT/US2008/057493 Mar. 19, 2008 and claims priority to U.S. Provisional Patent Application Ser. No. 60/919,254, filed Mar. 20, 2007. A claim of priority to each of U.S. Ser. No. 12/450,244; PCT/US2008/057493; and, U.S. Ser. No. 60/919,254 is made to the extent appropriate. U.S. Ser. No. 12/450,244; PCT/US2008/057493; and, U.S. Ser. No. 60/919,254 are incorporated herein by reference.

FIELD OF THE DISCLOSURE

This disclosure relates to systems and methods for separating hydrophobic fluids (such as oils) which are entrained as aerosols, from gas streams (for example air streams). Further, the arrangements also provide for filtration of other contaminants, such as carbon material, from the gas streams. The arrangements are typically used to filter crankcase ventilation gases, from engine systems. Methods for conducting the separations are also provided.

BACKGROUND

Certain gas streams, such as engine blow-by gases (i.e., crankcase ventilation gases, from the crankcases of the diesel engines) carry substantial amounts of entrained oils (liquid) therein, as aerosol. The majority of the oil (liquid) droplets within the aerosol are often within the size of 0.1-5.0 microns.

In addition, such gas streams also carry substantial amounts of fine particulate contaminant, such as carbon contaminants. Such contaminants often have an average particle size within the range of about 0.5-3.0 microns.

In some systems, it is desirable to vent such gases to the atmosphere. In general it is preferred that before the gases are vented to the atmosphere, they be cleaned of a substantial portion of aerosol and/or organic particulate contaminate therein.

In other instances, it is desirable to direct the air or gas stream into equipment. When such is the case, it may be desirable to separate aerosolized liquids and/or particulates from the stream during circulation, in order to provide such benefits as: reduced negative effects in the downstream equipment; improved efficiencies; recapture of otherwise lost oil; and/or, to address environmental concerns.

Improvements in crank cases ventilation filter systems (i.e., blow-by gas filtration systems) constructed for application with a variety of engine or equipment systems, are generally sought.

SUMMARY OF THE DISCLOSURE

Herein, assemblies, components, and techniques and features usable for crankcase ventilation systems are described and shown. There is no specific requirement that a system component or applied technique include all of the specific features described herein, to obtain some advantage or benefit according to the present disclosure.

In general, a crankcase ventilation filter assembly is described, including the housing defining a gas flow inlet, gas flow outlet and a liquid drain arrangement; and, a serviceable filter cartridge removably positioned within an interior of the housing. The term "serviceable" in this context, when used herein to reference a filter cartridge, is meant to refer to a filter cartridge that can be removed from the housing, to be serviced or replaced in a housing. Herein the term "serviceable" in this context is meant to be synonymous with "removable" or "removable and replaceable".

The housing generally includes: a housing base; and, an access cover which was removably mounted on the housing base to provide service access to an interior of the assembly. For an example described, the cover is threadably mounted on the housing base; and, the housing base includes the gas flow inlet, a gas flow outlet and liquid drain arrangement therein.

Herein a cartridge-to-housing base (or housing base-to-cartridge) rotational alignment indexing arrangement is described, assuring that the cartridge can only be positioned in the base in the single, selected, rotational orientation. Also, a cartridge-to-access cover portion (or access cover portion-to-cartridge) rotational alignment indexing arrangement is described, ensuring that a portion of the housing access cover can only be oriented a single, selected, rotational orientation relative to the cartridge, in the assembly.

Also described is a unique cartridge arrangement, including, among other things, an end piece with a flow aperture arrangement therethrough, and a non-circular projection addition around the flow aperture arrangement. An example of a circular projection having a "D" shape is described. A specific example is depicted, in which a straight side portion of the "D" projection, opposite a curved section, includes liquid flow aperture or gap arrangement therethrough.

Other advantageous features in the housing, the access cover and the filter cartridge are described herein below.

BRIEF DESCRIPTION OF THE DRAWINGS

FIG. 2 is a schematic top plan view of the crankcase ventilation system of FIG. 1.

DETAILED DESCRIPTION OF THE PREFERRED EMBODIMENT

I. Crankcase Ventilation (CCV) Filter Assembly Features
A. General Features of a CCV Filter Assembly; FIGS. 1-4

Figure 1:
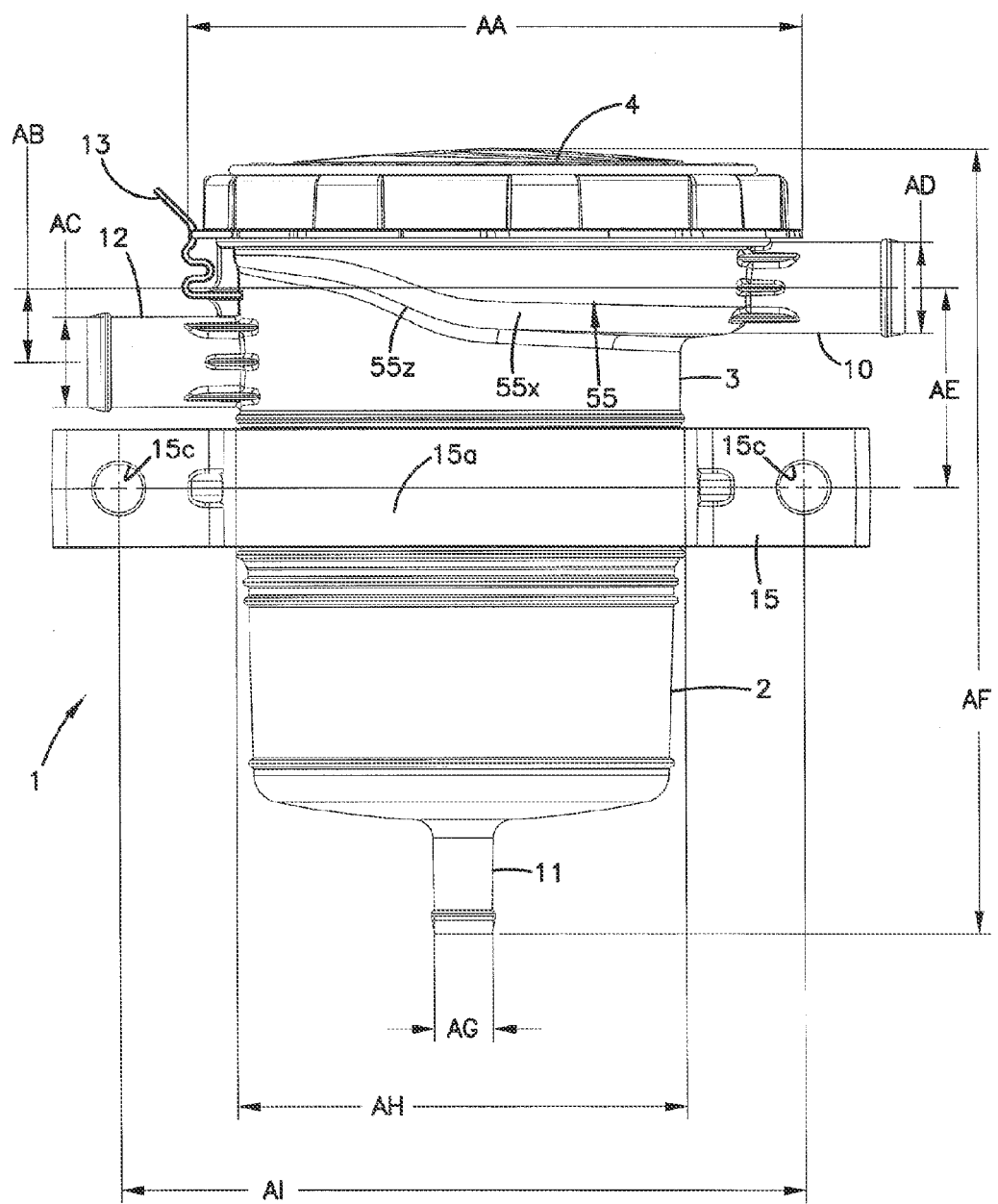
FIG. 1 is a schematic side elevational view of a crankcase ventilation filter arrangement, according to the present disclosure.

The reference numeral 1, FIG. 1, generally represents a crankcase ventilation filter assembly according to the present disclosure. The assembly 1 depicted in FIG. 1 includes a housing 2 defining a housing interior and including a housing base 3, a top, or access (or service) cover or cover assembly 4, and an internally received serviceable, i.e., removable and replaceable filter cartridge or service component, not depicted in FIG. 1, but shown in FIG. 7 at reference numeral 5.

In general, the housing 2 includes gas flow inlet 10, liquid drain outlet 11 and gas flow outlet 12. For the example assembly 1 depicted in FIG. 1, the gas flow inlet 10, the gas flow outlet 12 and the liquid drain outlet 11 are each positioned in the housing base 3.

In use, blow-by gases (crankcase ventilation gases) are directed into the assembly 1 through inlet 10. Within the assembly 1, at least a portion of liquid particles (droplets) carried within the crankcase ventilation gases are coalesced, and drain outwardly from the assembly through drain outlet 11, typically at least under gravity influence. The gases are filtered, and the outlet gases leave the assembly 1 through gas outlet 12.

The access or service cover or cover assembly 4 is removable from base 3. After a period of use, an internally received cartridge 5 will typically need to be serviced, for example by refurbishment or replacement. When such is the case, the access cover 4 is removed; the cartridge 5 is removed from the assembly 1; and, a new or refurbished cartridge 5 is installed. Herein the cartridge 5 which is removable and replaceable within the housing 2, is generally referenced as a "serviceable" cartridge.

Figure 1A:
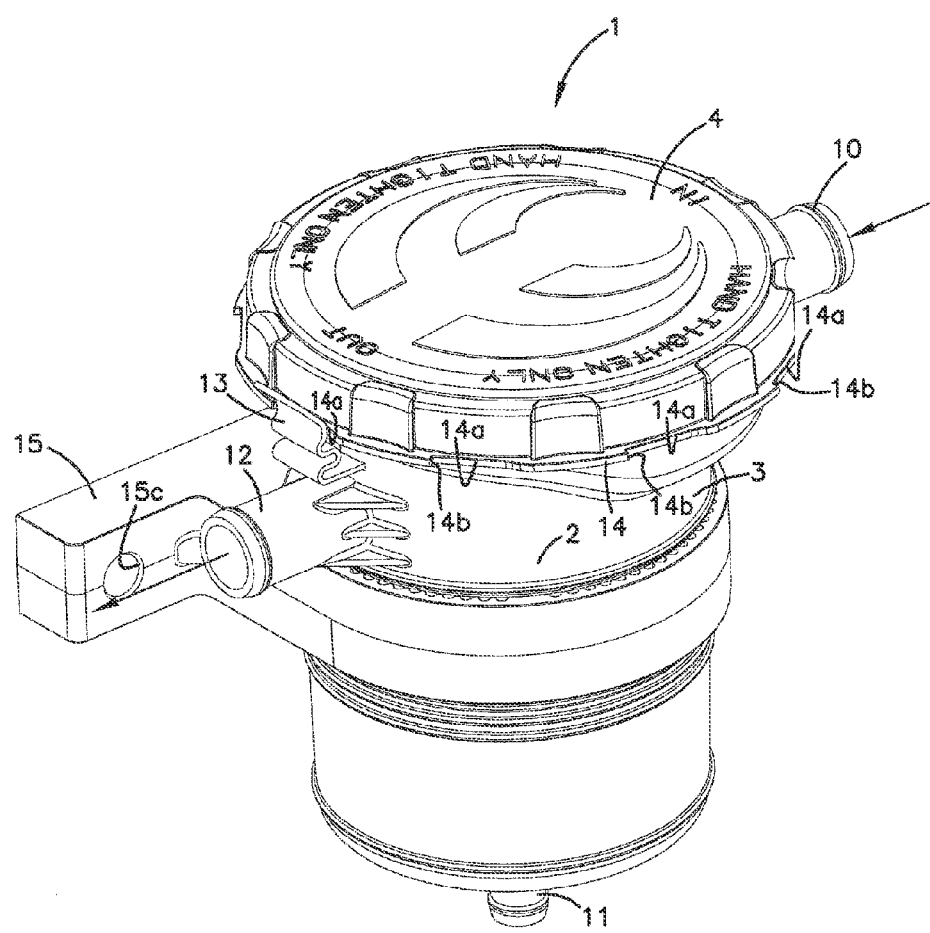
FIG. 1A is a schematic top perspective view of the crankcase ventilation filter arrangement depicted in FIG. 1.

In FIG. 1A, assembly 1 is depicted in a top perspective view, directed generally toward an outlet side, i.e. toward outlet 12. In FIG. 1A, flexible locking tab or locking flange 13 is viewable mounted on the base 3 at a location to align with and engage one of recesses 14a in cover rim 14, when cover assembly 4 in threaded engagement with base 3. Recesses 14a are provided with sharp sides 14b. As a result, the locking flange 13 and rim 14 form a ratchet system which inhibits rim 14 from rotation, in a counterclockwise manner (when viewed in the direction of FIG. 1A), when cover assembly 4 is in position on base 3. This inhibits the cover or cover assembly 4 of undesirably rotating, or loosening, when in use.

In FIG. 2, the assembly 1 is viewed in a top plan view. For convenience, cover or cover assembly 4 is marked with a designator "IN" at 10x in alignment with gas flow inlet 10, and the cover or cover assembly 4 is marked with a designator "OUT" at 12x in alignment with the gas flow outlet 12, when the cover or cover assembly 4 is properly secured to base 3, FIG. 1.

Referring again to FIG. 1, at reference numeral 15, a mounting arrangement is shown positioned around the housing base 3 of the assembly 1. The mounting arrangement 15 generally comprises a mounting band 15a separable from housing 2 and usable to secure the housing 2 to equipment, in use.

Figure 3:
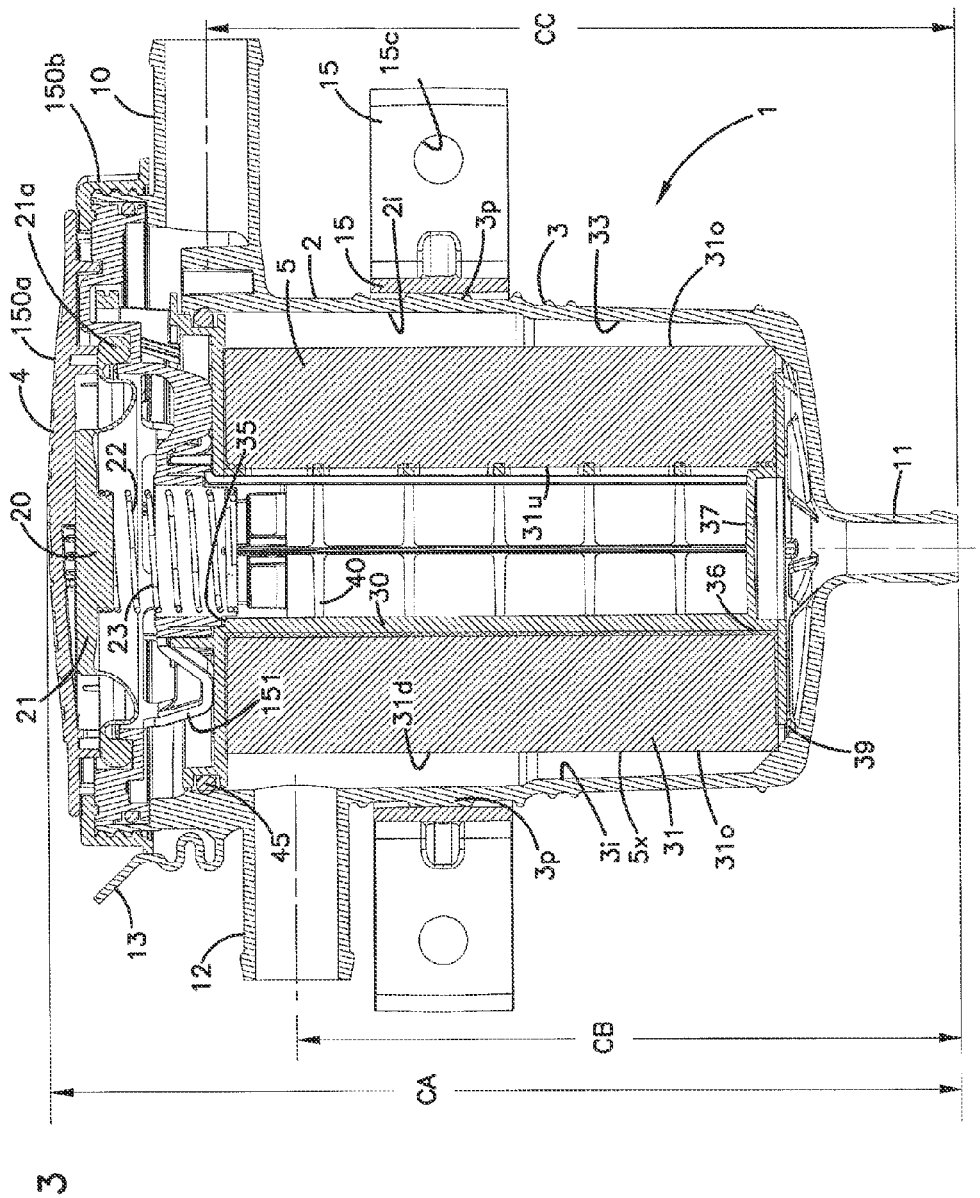
FIG. 3 is a schematic cross-sectional view taken generally along line 3-3, of FIG. 2.

Attention is now directed to FIG. 3, a cross-sectional view taken generally along line 3-3, of FIG. 2. Referring to FIG. 3, crankcase ventilation gas entry into the housing 2, again, occurs through inlet 10 and, the filtered gas flow outlet is indicated at 12, with a liquid drain outlet indicated at 11. Filter cartridge 5 is viewable, operably positioned within interior 3i of base 3 (i.e., within interior 2i of housing 2).

Referring still to FIG. 3, in operation, after crankcase ventilation gases are directed through inlet 10, the gases pass regulator valve assembly 20, and are directed into cartridge 5, in particular into open interior 30 (of cartridge 5), which is surrounded by media 31. The gases are then directed into, and through, the media 31. Within the media 31, at least a portion of liquid entrained within the gas flow stream will coalesce and drain from the media 31. Also, media 31 will capture selected particulate materials carried by the gas stream. The filtered gas stream then exits cartridge 5 at outer side or edge 5x, (i.e., outer surface or edge 31o of media 31) and enters annulus 33, a filtered gas flow annulus which surrounds cartridge 5. From the annulus 33, the filtered gases are directed outwardly from base 3 by passage through outlet 12. The filtered gases can be vented to the atmosphere, or be directed to other equipment, depending on whether an open or closed system is involved. Typically the system will be closed, for example as characterized in connection with FIG. 21.

In general, the regulator valve assembly 20 comprises a diaphragm 21 supported by a biasing arrangement 22. The diaphragm 21 is flexible, and is mounted to regulate flow of gases through flow aperture arrangement 35 into cartridge open interior 30. The biasing arrangement 22 typically comprises a coiled spring 23.

Figure 3A:
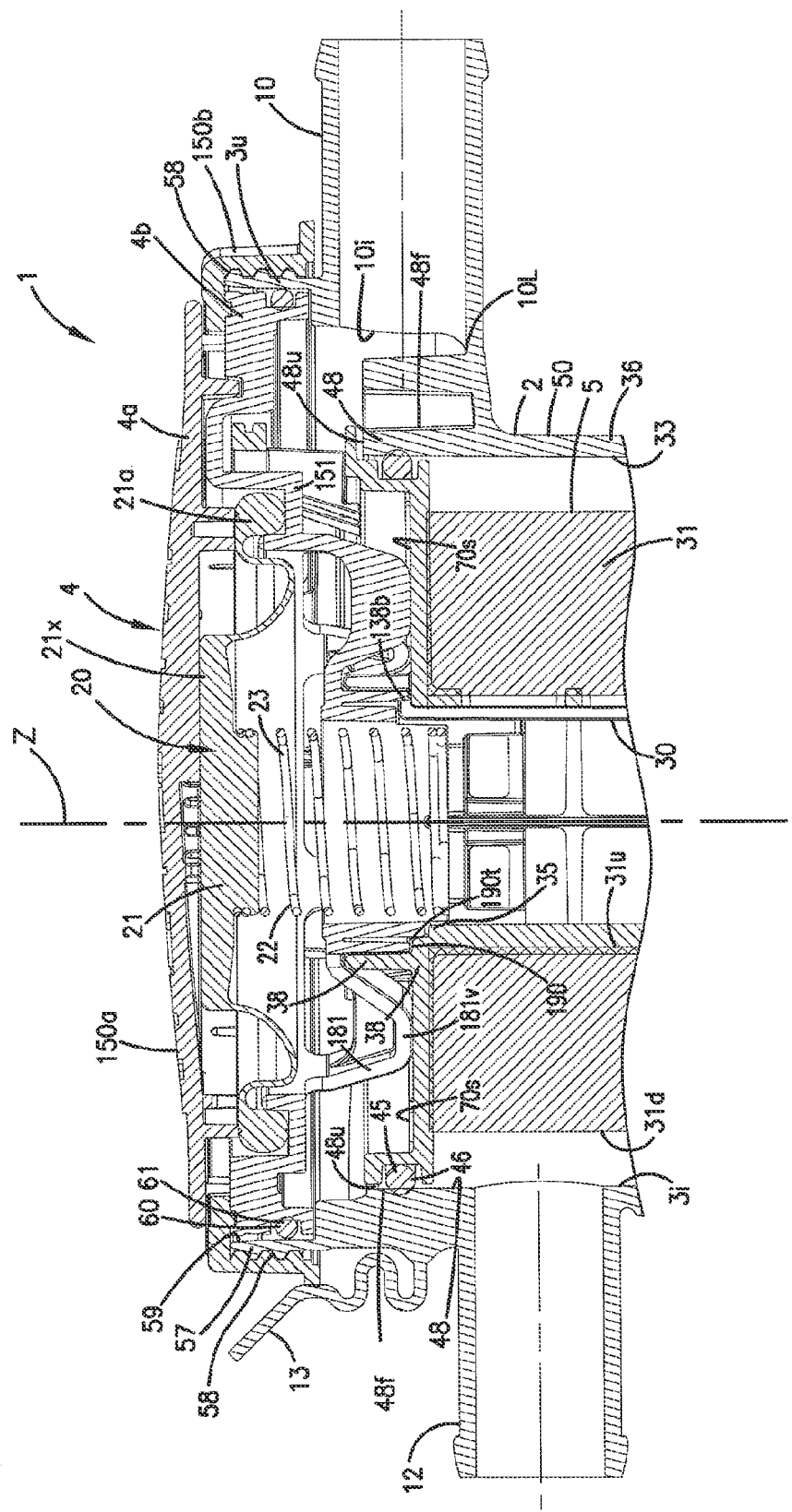
FIG. 3A is an enlarged, fragmentary view of a portion of FIG. 3.

In FIG. 3A, an enlarged fragmentary view of portion of FIG. 3 is shown. It can be seen that diaphragm 21 comprises a rolling diaphragm 21x with an outer bead 21a secured between portions 4a, 4b of cover assembly 4.

Referring again to FIG. 3, within open cartridge interior 30, the gas flow is directed through the media 31, from upstream surface or edge 31*u* to downstream surface or edge 31*d*, in part because end 36 of open cartridge interior 30 opposite from flow aperture arrangement 35, is closed by end piece 37. In the example shown, the upstream surface or edge 31*u* is within, and defines, interior 30; and, downstream surface or edge 31*d* is an outer circumferential surface 31*o*, of media 31. Thus, for the assembly depicted in the figures, filtering flow "in-to-out," with reference to the media 31.

Liquid drained from the media 31 can flow out from outer surface 31*o* of media 31. Liquid flow can also occur directly downwardly through a bottom end 39 of media 31, when the cartridge 5 includes a bottom liquid drain arrangement as depicted, and as discussed below. By "directly downwardly" in this context, it is meant that the liquid drainage referenced can be out of the media 31 through end 39, without necessarily needing to exit through surface 31*d*.

It is noted that open interior 30 of media 31 (and cartridge 5) includes an inner support structure 40, in the form of a tubular grid with an openings therein.

Cartridge 5 can be provided with a outer, porous, liner, not depicted, around outer surface 31*o* media 31, if desired.

Referring to FIG. 3A, at 45 a housing seal arrangement is depicted, providing a seal between cartridge 5 and the housing base 3. The housing seal arrangement 45 separates upstream (unfiltered) and downstream (filtered) regions within assembly 1. For the particular example shown, the housing seal arrangement 45 comprises an o-ring 46, which engages an upper end seal flange or seal surface 48 in housing base 3. In particular, for the example depicted, seal surface 48 surrounds seal member 45 and surface 48 is positioned for sealing engagement by seal member 45. Thus, the housing seal arrangement 45, for the example shown, is a peripheral, perimeter, arrangement on an end of cartridge 5, and which is radially outwardly directed therefrom. For the particular example assembly 1 shown in the figures, an upper open end 48*u* of surface 48, defines a generally circular definition. Surface 48 comprises a portion of an upper portion, region, projection or flange 48*f* in base 3.

Still referring to FIG. 3A, for the example shown it is noted that engagement between the seal 45 and the surface 48 is at a portion of surface 48 which is above a lower most portion 10L of inlet 10, i.e., location of seal 45 is above the bottom of entry 10*i*, located at 10L.

For the system shown, the inlet 10, the regular valve assembly 20, and interior 30 of cartridge 5, are located on the upstream side of the seal 45 and media 31. The clean gas annulus 33, drain 11, and the outlet 12 are on the downstream side of the housing seal arrangement 45.

Referring again to FIG. 3A, interior 3*i* of base 3 is in part defined by a lower inner wall 50 having surface 48 on an upper portion thereof. This lower inner wall 50 generally has a cylindrical shape, with a circular cross-section. A center axis for wall 50 and cartridge 5 is shown at Z.

Aerosolized liquid contained within the inlet gas stream at inlet 10, can begin to coalesce along housing surfaces upstream of, and in some instances below, diaphragm 21. It is noted that a lower portion 10L of the inlet 10, at which such coalescing may occur, is located lower than a top 48*u* of flange 48*f*, and also lower than flow aperture arrangement 35 of cartridge 5. For coalesced liquid within inlet 10 and around region 48*f* to reach interior 30, the coalesced liquid must be directed to a location above top end 48*u* of region 48*f*.

Figure 10:
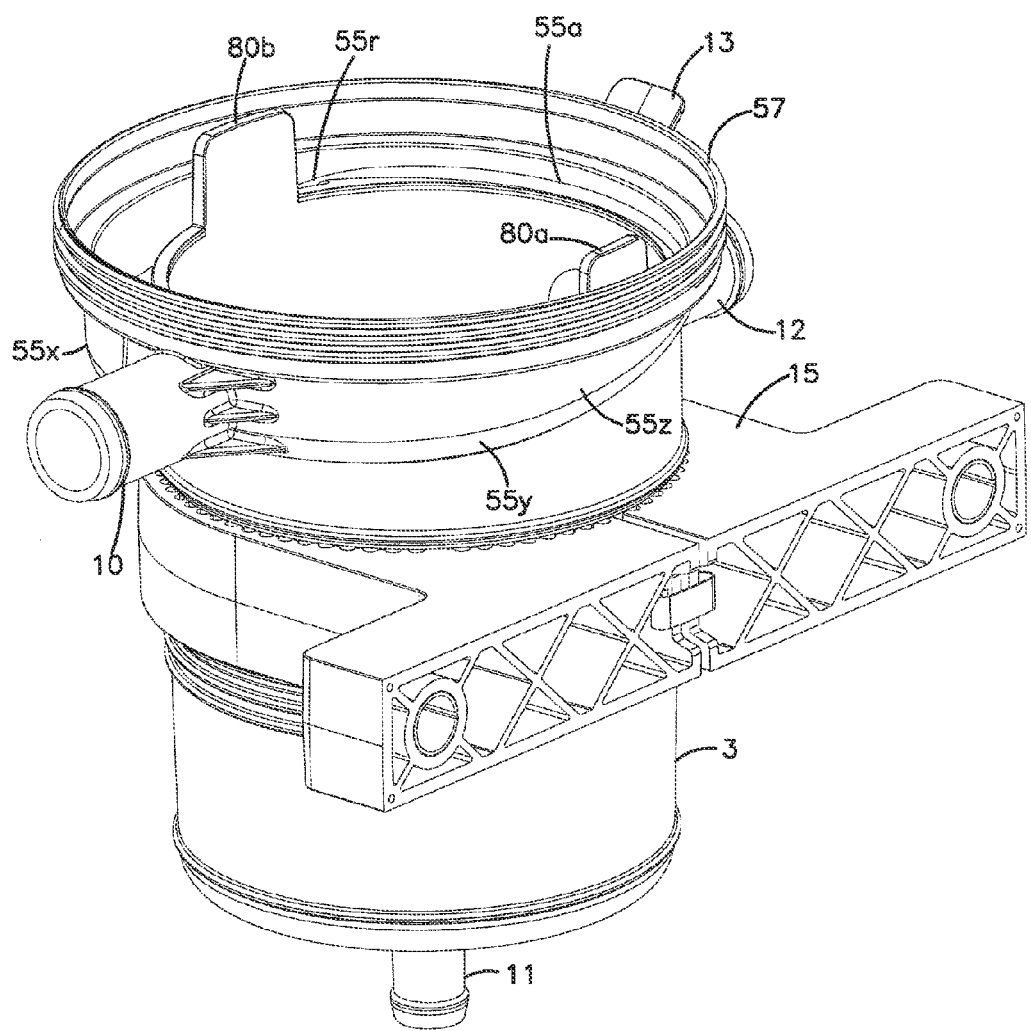
FIG. 10 is a schematic top, inlet side perspective view of a housing base portion of the assembly depicted in FIGS. 1-3A.

Referring to FIG. 1, to accommodate this, inlet 10 is directed into a gutter or trough arrangement 55 (herein a "gas/liquid flow gutter arrangement") extending at least partially around cartridge 5. For the example shown, half of trough or gutter arrangement 55 is depicted in FIG. 10 at 55*x*. A mirror image to section 55*x* is positioned on an opposite side of base 3. The trough half 55*x* extends partially around cartridge 3, and flange 48*f*, from inlet 10, and includes a defined an interior trough or flow channel with an upwardly directed ramp or ramp section at 55*z*. Airflow can push collected, coalesced, liquid along an inside of ramp section 55*z* until a location above seal surface 48 and aperture arrangement 35 of cartridge 5 is reached. From there, the liquid can drain onto the cartridge 5, and into aperture arrangement 35.

In general, the trough or gutter arrangement 55 is in part defined between a portion of upper flange 48*f* (FIG. 3A) and a portion of an outer perimeter of an upper section 3*u*, of housing base 3.

Figure 4:
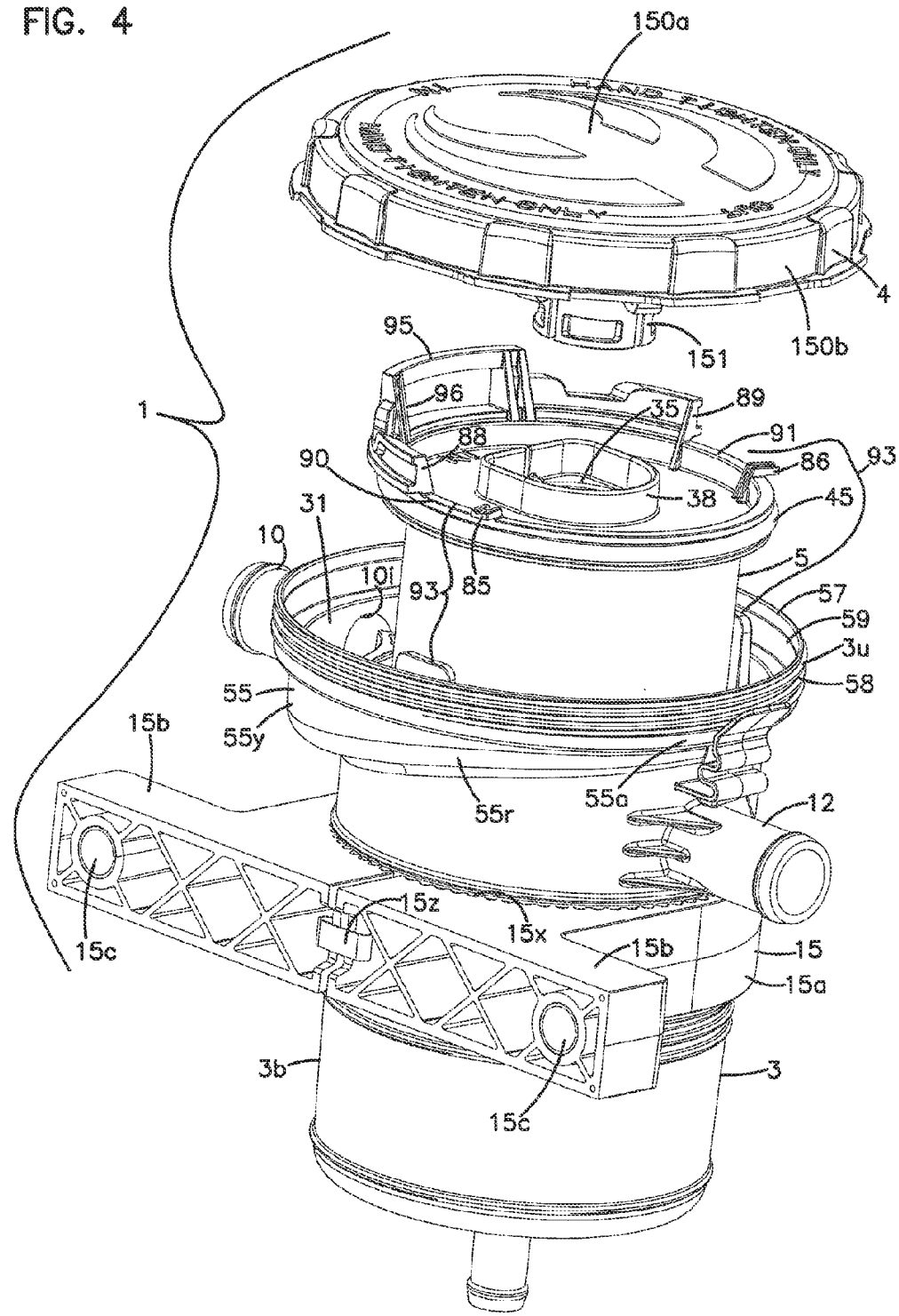
FIG. 4 is a schematic, exploded, perspective view of the crankcase ventilation system depicted in FIGS. 1-3A.

Attention is now directed to FIG. 4, a top exploded, outlet end perspective view of assembly 1. Referring to FIG. 4, upper portion 3*u* of housing base 3 defines upper, open, access opening 57 having an (exterior) threaded mount 58 by which access cover assembly 4 can be secured to upper region 3*u*, by threaded engagement.

For the example shown, upper portion 3*u* in access opening 57 defines a generally circular shape. It is noted that the circular shape of flange 48*f*, FIG. 3A and seal surface 48 is not aligned coaxially or concentrically, with the circular shape of portion 3*u* of flange 57. That is, two portions of 3*u*, 48*f* of housing base 3 each define a circular definition, but they are not coaxial or concentric; i.e., they are eccentrically positioned. The first is flange 48*f* or seal surface 48 (which forms a top portion 48*u* of a bottom section 3*b* of housing base 3) and the second is flange 57, which is part of upper section 3*u* of housing base 3.

Referring to FIG. 4 at 55*y*, a side of the trough arrangement 55 opposite side 55*x*, FIG. 1, is viewable. It can be seen to include an internal upwardly directed ramp section 55*r* directed toward apex region 55*a*. The opposite side 55*x*, via ramp 55*z*, FIG. 1, would also direct liquid up to apex region 55*a*. In general terms, then, the trough arrangement 55, which extends at least partially around housing base 3 and cartridge 5, includes a ramp arrangement (in the example formed by ramp sections 55*z*, 55*r*) directing liquid to apex or upper region 55*a* of trough arrangement 55.

From the discussions with respect to FIG. 1 and also FIG. 4, it can be understood that crankcase ventilation gases entering housing base 1 via inlet 10, (i.e. entering interior 2*i* at inlet end 10*i*) enters a trough arrangement 55 which directs some air and coalesced liquid upwardly, due to the ramp arrangement 55*r*, 55*z* around to upper or apex portion 55*a* of base 3, via the two sides 55*x*, 55*y*. In particular, each side 55*x*, 55*y* includes an upwardly directed ramp section or ramp 55*z*, 55*r* respectively, which will help direct any liquid droplets coalesced within region 55 under airflow toward apex area 55*a*, interiorly of the region 57. Liquid can flow from apex 55*a* over end 48*u* of region 48, onto cartridge 5 and into aperture arrangement 35.

Figure 4A:
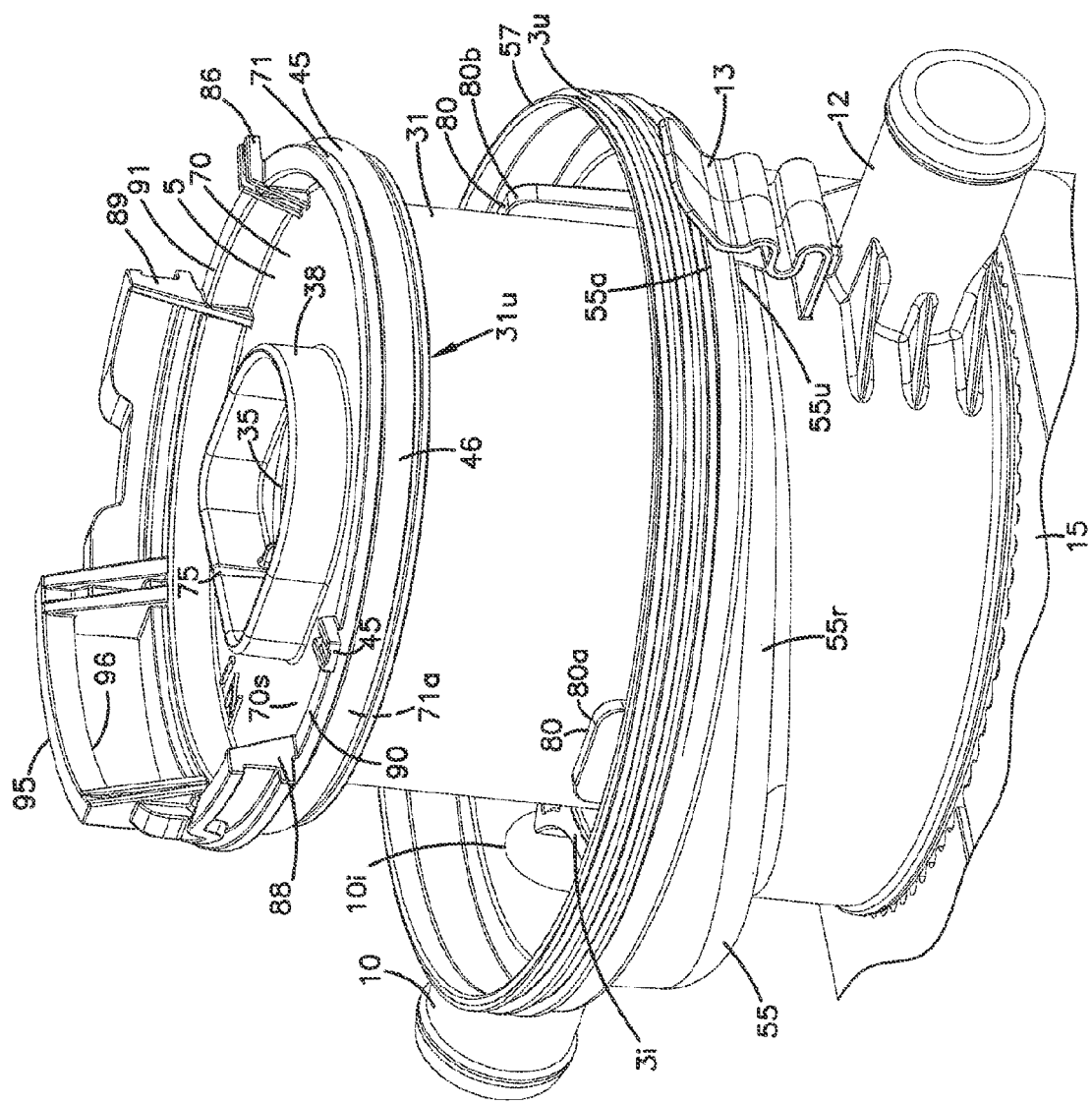
FIG. 4A is an enlarged, fragmentary view of a portion of FIG. 4.

In FIG. 4A, an enlarged, fragmentary view of a portion of FIG. 4 is shown. In a portion viewable in FIG. 4A, selected features characterized in the previous two paragraphs are readily viewed.

Referring back to FIG. 4, some additional features related to the assembly 1 can be viewed. Mounting arrangement 15 can be seen to have mounting flange portions 15*b*, and center band portion 15*a* which surrounds base 3. The mounting flange portions 15*b* include apertures 15*c* therethrough, through which bolts or other connectors can extend, to secure the mounting band 15, and thus assembly 1 to equipment, for use.

Still referring to FIG. 4, radially interior edge 15x of center band 15a, which engages housing base 3, can be seen to have a serrated, or ridged, inner surface. Projections 3p on base 3, FIG. 3, underneath mounting arrangement 15, are sized to be engaged by ridges 15x, to inhibit rotational slippage of the mounting arrangement 15, relative to the housing base 3. Thus the mounting arrangement 15 can be positioned on the housing base 3 at an appropriate, selected, rotational location, for mounting to equipment to which the assembly 1 is eventually to be mounted. This rotational positioning of mounting engagement 15 on base 3 can be conducted as a prestep, facilitating mounting. Clip 15z is shown securing the band 15 closed.

As an example, during manufacture of assembly 1, mounting arrangement 15 can be appropriately rotationally positioned in housing base 3, for a particular installation. The part can then be shipped with mounting arrangement 15 appropriately positioned, and thus will be received by an installer assembly as facilitated.

Referring to FIG. 3A, it is noted that interior surface region 59 of rim 57 is a seal surface, for seal arrangement 60, in the example shown comprising an o-ring 61, positioned on cover assembly 4. Thus when cover assembly 4 is threaded in place on threads 58, o-ring seal 61 engages, and seals against, surface portion 59 on an opposite side of rim 57 from the threads 58.

Still referring to FIG. 3A, it is noted that axis Z indicates an approximate center line for cartridge 5 and interior surface 3x of a lower portion 3d of housing base 3. Axis Z, however, is not center line for threaded region 58, flange 57, seal surface 59 and a perimeter of cover or cover assembly 4. Again, this reflects, as discussed previously, that flange 57, i.e., upper portion 3u of housing base 3, is not concentric or coaxially aligned with lower portion 3d of housing base 3. In general terms, the housing base 3 includes an upper portion 3u and a lower portion 3d. The two portions 3u, 3d generally each define a circular definition, both for interior and an exterior. However the circular portions of regions 3u, 3d, are not concentrically aligned. Rather, they are eccentrically positioned, within housing base 3.

Referring to FIG. 4A, attention is directed to selected features of cartridge 5. In particular, media 31 includes first upper end 31u. Upper end 31u terminates adjacent end piece 70, which form a first, upper in use, end piece on cartridge 5. By "upper" in this context, it is meant that the end piece 70 is typically directed upwardly, when the cartridge 5 is installed for use.

End piece 70 includes central aperture arrangement 35, extending therethrough, in flow communication with open interior 30, FIG. 3A, of cartridge 5.

End piece 70 includes a first outer surface 70s on a side of end piece 70 opposite the media 31.

The upper end piece 70 includes a plurality of additional features including: outer circumferential rim 71 with a trough 71a supporting perimeter housing seal arrangement 45 (in the example shown comprising o-ring 46). As described in connection with FIG. 3, the o-ring 46 is positioned so that when cartridge 5 is fully installed in base 3, seal arrangement 45 engages seal surface 48 along an interior of (lower portion 3d) of base 3, at a position above a lower most portion 10L of inlet 10.

End piece 70 of cartridge 5, FIG. 4A, further includes a central projection 38 thereon. The central projection 38 generally projects away from the media pack 31, and toward cover assembly 4, when cartridge 5 is installed. There is no specific requirement that projection 38 extend parallel to a central axis (Z, FIG. 3A) of the cartridge 5. However, typically the direction of extension will be parallel or nearly parallel (but for example for a draft angle) to axis Z. In some instances, the projection 38 may be characterized as an "axial projection", such a term being meant to refer to a projection generally in a direction of axis Z. The term "axial projection" is not meant to require, specifically, that the direction of projection be precisely parallel with access z.

The projection 38 is positioned around aperture arrangement 35, FIG. 3, and spaced inwardly from an outer perimeter (for example rim 71) of end piece 70. By the characterization that the projection 38 extends "around" the aperture arrangement 35, it is not meant that the projection 38 necessarily extends continuously and completely around the aperture arrangement 35. However, typically projection arrangement 38 will be continuous in extension around at least the majority, typically at least 80% of, and sometimes at least 90% of, the aperture arrangement 35. The flange 38 includes a gap 75 therein. The gap 75 extends completely through flange 38. Gap 75 is a flow gap arrangement, for liquid that reaches surface 70s of end piece 70. Such liquid, as a result of gap 75, can flow through flange 38 into aperture arrangement 35 and thus into cartridge interior 30 and media 31. Liquid can reach surface 70s, as for example, after having coalesced with an upper portion 3u of housing base 3d, and then traveling up through ramp arrangement 55r, 55z under gas flow pressure, until apex 55a is reached. The liquid can then drain downwardly from apex region 55a onto surface 70s, and then through gap arrangement through 75 aperture arrangement 35 and into interior 30 of cartridge 5.

It is noted that flange 38, for the example shown, defines a non-circular perimeter definition. The non-circular perimeter definition is discussed further below, in connection with other figures. In general, the non-circular perimeter facilitates rotational alignment with other features in the assembly 1.

Still referring to FIG. 4A, base 3 includes two, rotationally spaced, upwardly projecting cartridge locator projections, flanges or ears 80. The locator projections 80 can generally be identical to one another. The locator projections 80 are spaced radially around a portion of cartridge 5. Generally, the degree of spacing of the locator projections 80, on center, is greater in one radial direction around cartridge 5 (in this instance the direction crossing over inlet 10i), than it is in a second radial direction around base 3 (in this instance a direction that crosses above outlet 12). This can also be seen by reference to FIG. 5. (By "on center" in this context, reference is meant to a radially spacing beginning from a radial center from one projection extending to a radial center of the other projection.)

Still referring to FIG. 4A, cartridge locator projections 80 serve to help properly, rotationally position the cartridge 5, within cartridge 3. In particular, end piece 70 of cartridge 5, FIG. 4A, includes spaced, outwardly projecting, radial projections 85, 86; and, spaced locator shoulders 88, 89. Projection 85 and locator shoulder 88 are spaced to define a first gap or receiver 90 therebetween; and projection 86 and locator shoulder 89 are spaced to define a second gap or receiver 91 therebetween.

When cartridge 5 is fully inserted in base 3, one of the cartridge locator projections 80, i.e., projection 80a will extend into the receiver 90, between projection 85 and shoulder 88; and the other projection 80b will extend into the receiver 91 between projection 86 and shoulder 89. Receivers or gaps 90, 91, are spaced on center, in at least one radial direction, a distance corresponding to an angle of less than 180°. The receivers or gaps 90, 91 will typically be sized to just fit, with a little clearance, the projections 80a, 80b. The non-symmetrical (rotational) positioning of the ears 80a, 80b, around rim 57, will ensure that there is only one rotational position allowing cartridge 5 to be fully nested inside of base 3. That rotational orientation is shown in FIG. 5.

In general terms, referring to FIG. 4, assembly 1 includes a cartridge-to-housing base (or housing base-to-cartridge) rotational alignment indexing arrangement 93, which is constructed and arranged to insure that the cartridge 5 can only be operationally positioned in the housing base 3 (or housing 2) in a single, selected, rotational orientation. For the particular assembly 1 depicted, the cartridge-to-housing base rotational alignment indexing arrangement 93 comprises a projection/receiver arrangement including a projection arrangement (projections 80a, 80b for example) on housing base 3, engageable by receiver arrangement (the example shown, receivers 90, 91) on cartridge 5. The location of the projection(s) 80 and receiver(s) 90, 91, is such that the cartridge 5 can only be installed in the housing base 3 in one selected rotational orientation around axis Z, FIG. 3.

FIG. 10, base 3 is viewable with cartridge 5 removed. Locator projections of 80a, 80b are viewable. Also viewable is trough sections 55x, 55y with upwardly directed ramps 55z, 55r extending toward apex region 55a.

Figure 5:
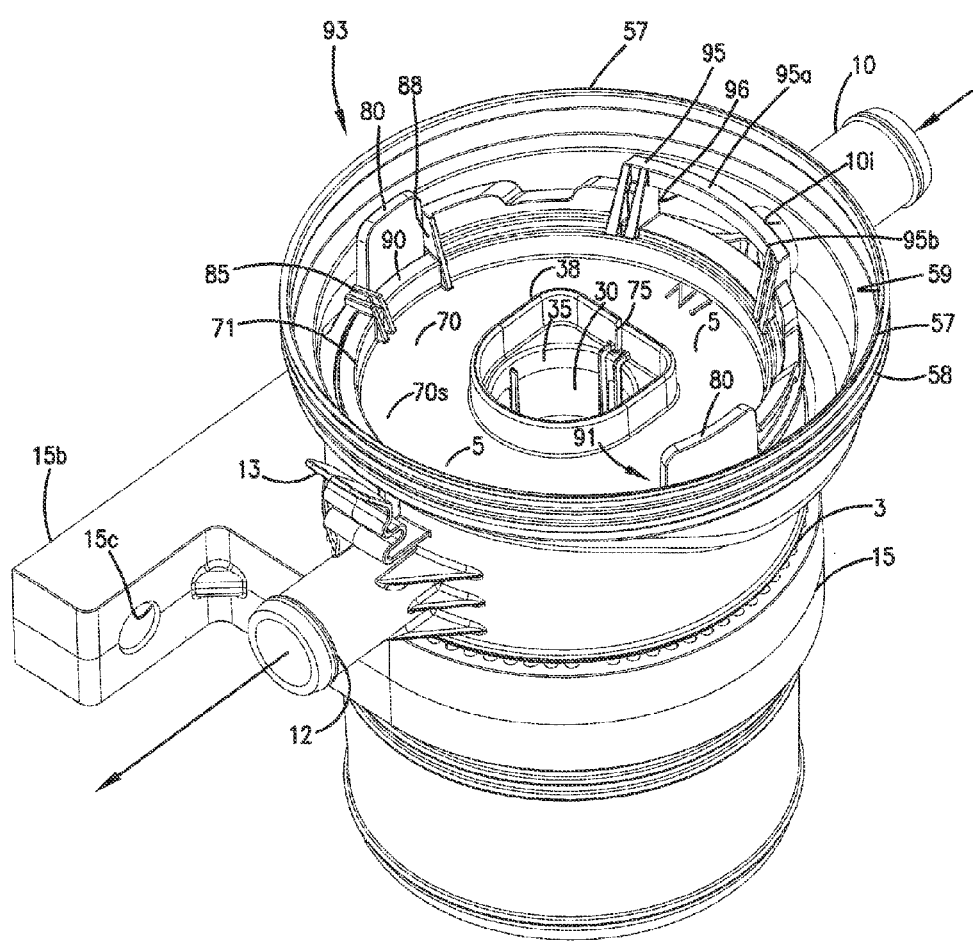
FIG. 5 is a schematic, top, outlet side perspective view of a housing base portion of a crankcase ventilation system according to FIG. 4, depicted with an internally received serviceable filter cartridge positioned therein and with an access cover removed.
Figure 6:
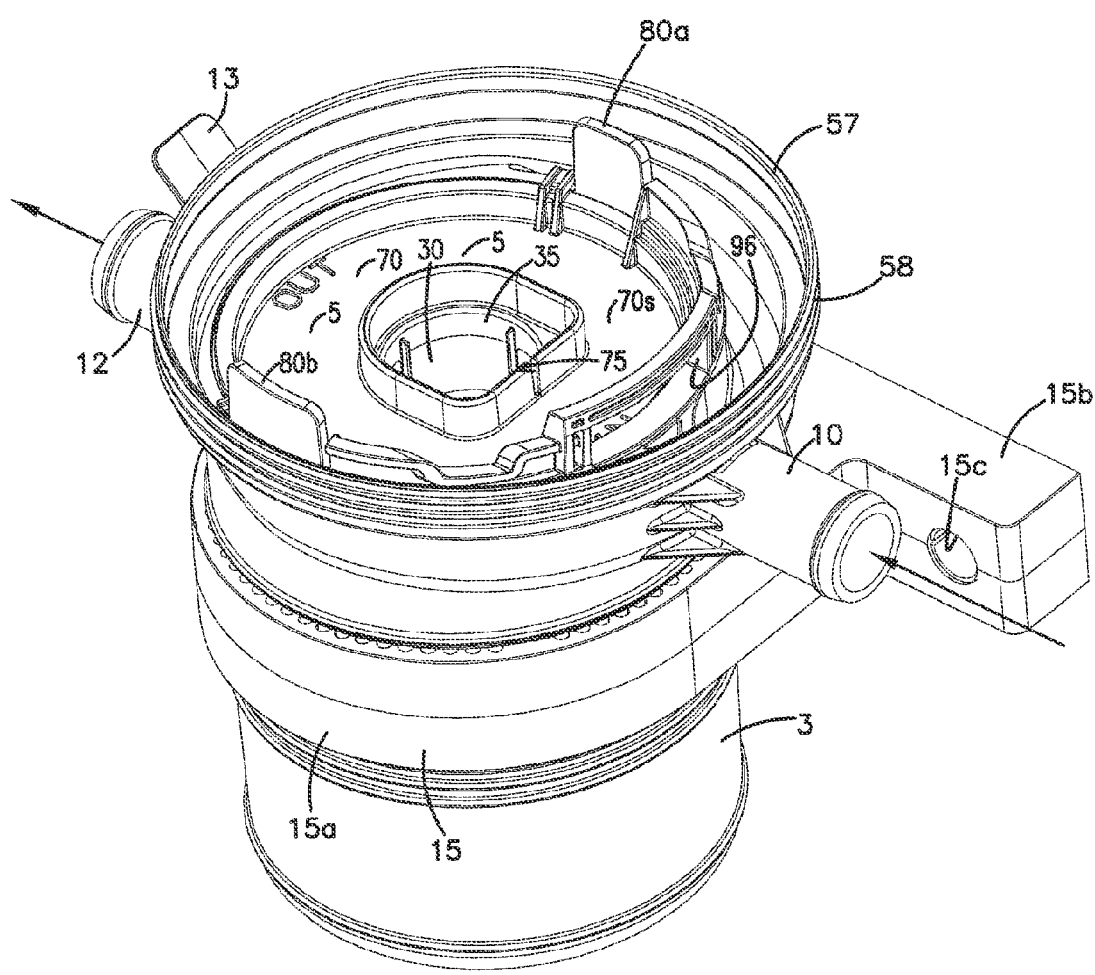
FIG. 6 is a schematic top, inlet side, perspective view of the assembly depicted in FIG. 5.

In FIGS. 5 and 6, the assembly 1 is depicted with the cover assembly 4 removed, but with the cartridge 5 fully inserted in the housing base 3. In these Figs., it can be seen that the cartridge 5 has only one rotational orientation (around axis Z, FIG. 3) relative to the housing base 3, in which the cartridge 5 can be fully (operationally) inserted.

Referring still to FIG. 5, end piece 70 further includes, projecting therefrom, handle arrangement 95. The handle arrangement 95 depicted is a perimeter handle arrangement 95b positioned at an outer circumferential (perimeter) portion of end piece 70, in particular on a portion of rim 71. The handle 95 includes a handle bridge 95a and further defines a central handle aperture 96 projecting through the handle 95 and under bridge 95a, between bridge 95 and a remainder of end piece 70. For the example shown, the cartridge 5 is rotationally indexed by engagement with the locator projections 80, such that aperture 96 is radially aligned with, and projects above, inlet 10 and aperture 10i. Further, aperture 96 is aligned with, and faces, a straight side portion of projection 38, discussed below. The example bridge 95a depicted is arcuate in extension partially around central aperture arrangement 35. The angle AR, FIG. 8, of arcuate extension is typically at least 30°, usually 40° or more.

The handle arrangement 95 is often referred to herein as a "perimeter" or "peripheral" arrangement, or by similar terms, since the handle arrangement 95 is secured to cartridge 5 at the perimeter region of end caps 70.

For the example shown, the handle arrangement 95 is "non-collapsible." By this, it is meant that the handle 95 remains upright, i.e., does not fold over otherwise collapse during installation of the cartridge 5 in the housing base 3. The term "non-collapsible" in its context, is not meant to indicate that the handle 95 cannot be collapsed by being broken if sufficient pressure is applied. Rather it is meant that in normal use of the handle arrangement 95 maintains a single orientation, and is not collapsed or folded during its normal use or handling.

Handle aperture 96 is depicted located in radial alignment with aperture 10i. This facilitates flow of air from inlet 10 across end piece 70 to aperture 35 for flow into cartridge interior 30. The handle aperture 96 also provides a convenient arrangement with handle bridge 95a, for grasping during installation and servicing. Thus, bridge 95a and handle aperture 96 are typically sized to accommodate a portion of service operator's hand projecting through aperture 96, to facilitate grasping of cartridge 5.

Still referring to FIG. 5, projection of rim 71 axially out from (upwardly from in use) surface 70s (i.e. in a direction away from media 31, FIG. 3) provides for rim containment of liquid that reaches surface 70s, facilitating liquid flow through gap 75 into aperture arrangement 35 and cartridge interior 30.

In FIG. 6, another view of the partial assembly depicted in FIG. 5 is shown, rotated from the view of FIG. 5, to facilitate observation of the identified features.

B. Further Regarding Features of Cartridge 5, FIGS. 7-9 and 17

Figure 7:
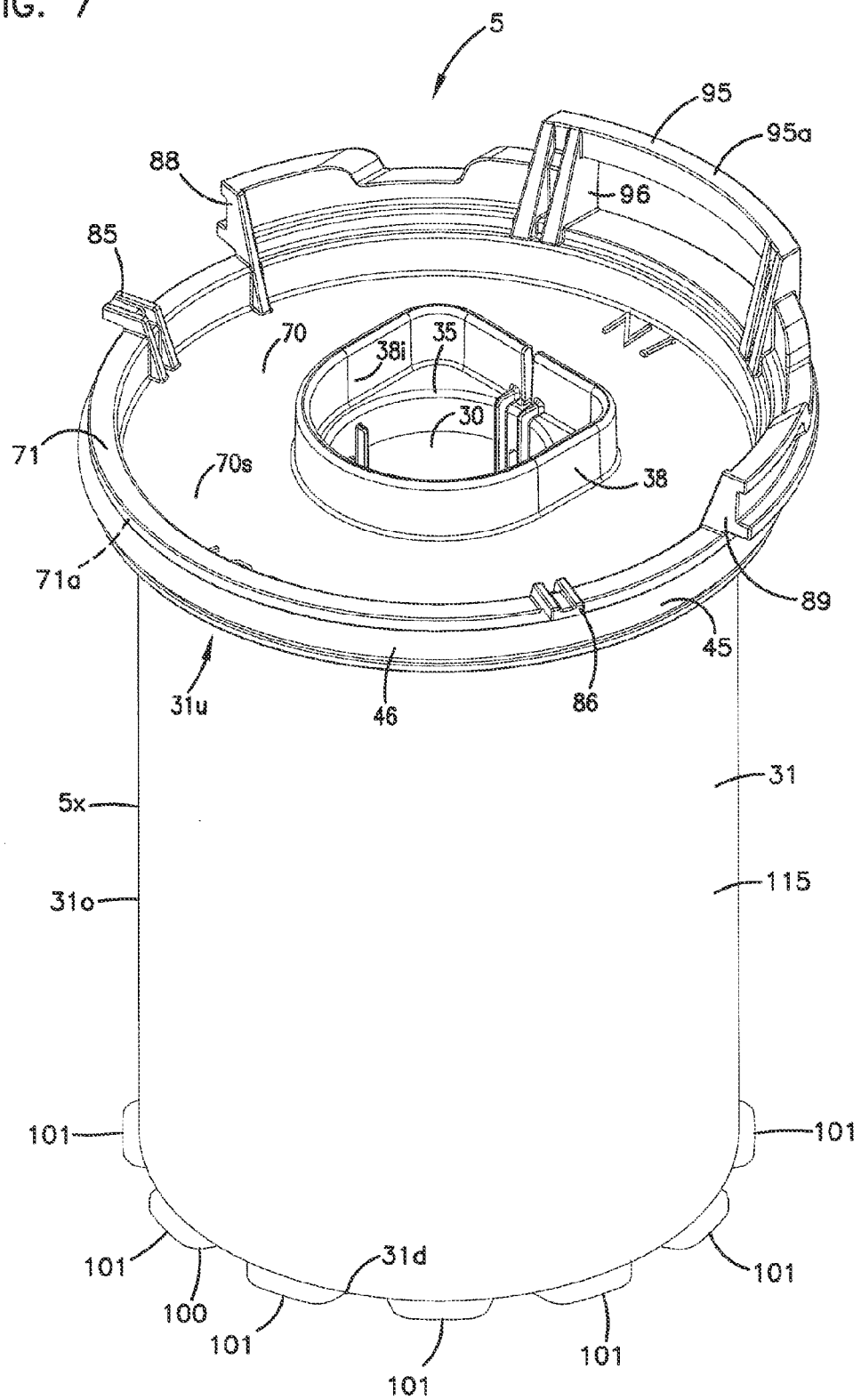
FIG. 7 is a schematic top perspective view of a filter cartridge usable in an assembly according to FIGS. 1-3A.
Figure 8:
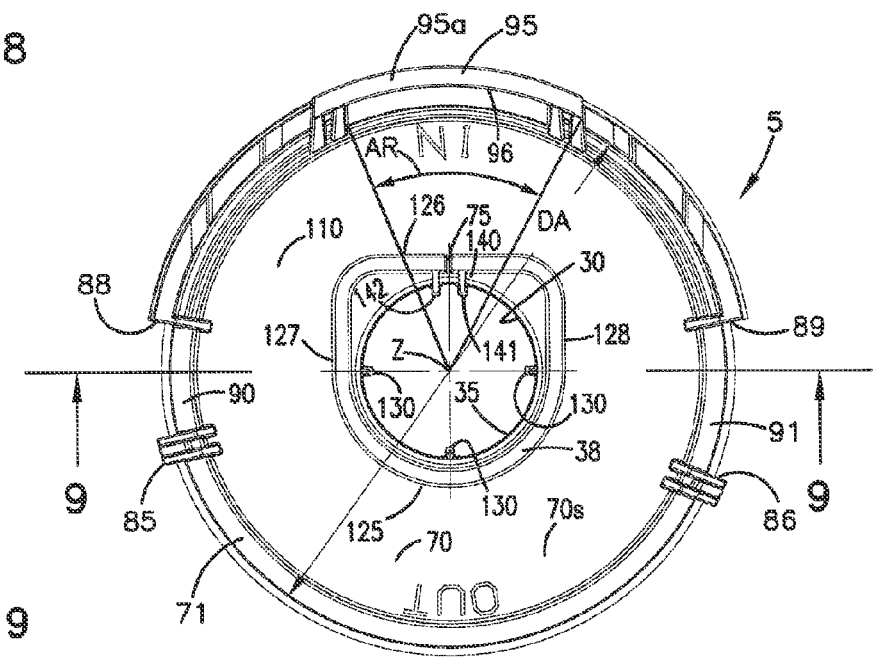
FIG. 8 is a schematic top plan view of the cartridge depicted in FIG. 7.
Figure 17:
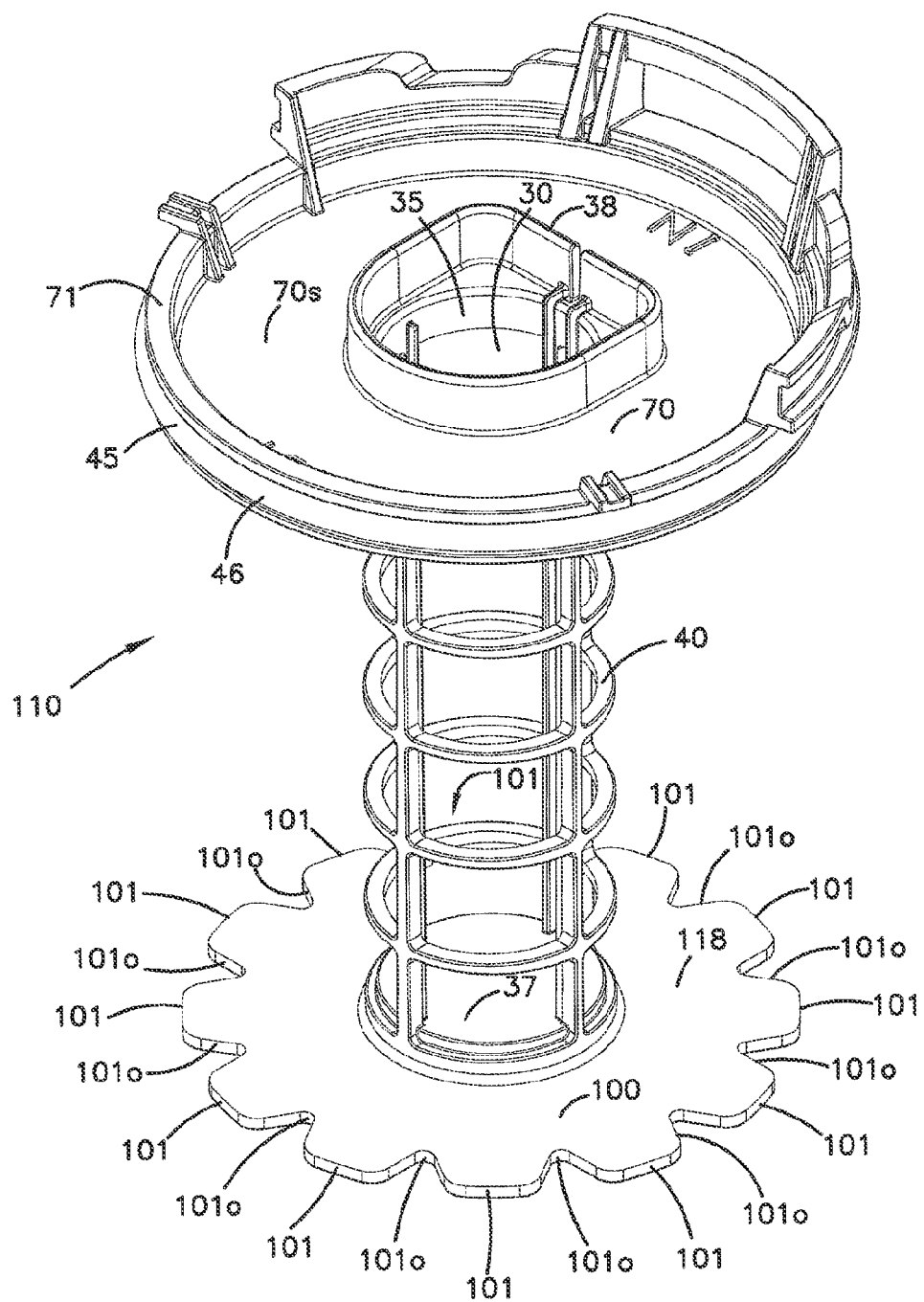
FIG. 17 is a schematic top perspective view of a component included in the filter cartridge of FIG. 7.

In FIG. 7, a top perspective view of cartridge 5 is provided. In FIG. 8 a top plan view is provided and in FIG. 9 a cross-sectional view. In FIG. 17 a component of the cartridge 5 is depicted, as discussed below.

Referring first to FIG. 7, cartridge 5 is depicted in perspective view, with end piece 70 viewable, the depiction being toward surface 70s. Surface 70s will sometimes be referred to as "recessed surface portion" of end piece 70, between perimeter rim 71 and projection 38.

It can be seen from FIG. 7, that opposite end piece 70, at opposite end 31d of media pack 31 (from end 31u) cartridge 5 includes a second end piece 100. Second end piece 100 is a lower or bottom end piece, when cartridge 5 as installed for use. End piece 100 for the example shown, includes a plurality of spaced outer peripheral projections 101.

Attention is now directed to FIG. 17, which depicts cartridge support piece 110. Cartridge support piece 110 generally comprises end piece 70, interior support 40 and piece 100, for the example shown formed integral with one another. Cartridge support piece 110, for typical applications, comprises a single, integral, plastic molded piece. To form cartridge 5, media 31, FIG. 7, is generally mounted around support 40 in extension between end pieces 100, 70, to form media pack 31. As an example, media 115 (FIG. 7) can be wrapped around support 40. As mentioned previously, an outer liner can be provided around the media 115.

Still referring to FIG. 17, it can be seen that end piece 100 comprises: central region 37 which encloses a lower end of open interior 30, in the resulting cartridge 5 of FIG. 7; perimeter, spaced, projections 101 and intermediate, closed, region 118. The projections 101 define spaced drain openings 101o therebetween. The drain openings 101o in the cartridge 5, FIG. 7, align with portions of bottom end 31d, of the media pack 31. This allows drain of liquid from media pack 31, in part, directly downwardly from end 31d, through drain openings 101o, adjacent an outer peripheral portion 310 of the media pack 31, i.e., adjacent outer surface 5x, FIG. 3. This creates a bottom drain arrangement for the cartridge 7.

In general terms, cartridge 17 includes a bottom end piece 100, in use, which includes bottom drain arrangement therein. The bottom drain arrangement comprises apertures, notches, or other features allowing for drainage of liquid for the media pack 31 direction downwardly, from the media pack 31, without the liquid needing to flow out of surface 310 of media 31 (i.e., from outer surface 5x of the cartridge 5). It is expected in a typical applications there will be liquid drainage both through outer edge 5x and also directly downwardly through the liquid drain arrangement, in this instance represented by drain openings 101o.

The cartridge 17, then, can be characterized as having an aperture arrangement in "direct drain overlap" with a bottom end of the media 31. By "direct drain overlap" in this context, it is meant that the drain aperture opening or drain apertures 101*o*, are aligned with a bottom end 39 of the media 31, so the liquid can drain directly from the media 31 through the drain openings 101*o*, without needing to necessarily pass through an outer surface 31*o* of the media 31. In typical operation, the liquid will flow both directly downwardly through the liquid drain arrangement, and outwardly from outer surface 31*o* of the media pack 31, to provide for a good liquid drainage flow from the media 31.

A good liquid drainage flow from the media 31 facilitates operation of the assembly 1, since drainage of liquid is important to overall operation of the cartridge 5. Incorporation of a bottom drain arrangement allowing for liquid flow both from the bottom of the media pack 31 and from the outer surface 31*o*, facilitates good drainage.

Bottom drain arrangements in general, for crankcase ventilation filters, are described in U.S. provisional application 60/731,287 filed Oct. 28, 2005 and PCT application US 06/41738 filed Oct. 27, 2006, each of which is incorporated herein by reference.

Referring again to FIG. 17, it is noted that region 37 of end piece 100 projects upwardly within tube 40 and within cartridge open interior 30 in use, relative to a remainder of end piece 100.

Attention is now directed to FIG. 8, a top plan view of cartridge 5. Referring to FIG. 8, it can be seen that projection 38 is non-circular and generally has a curved side section 125 and an opposite straight side section 126. The projection 38 further includes opposite straight transition regions or sections 127, 128 extending between side sections 125, 126. Thus, again, projection 38 preferably is not circular, but rather is non-circular and has a shape rotationally asymmetric around axis Z. By "rotationally asymmetric" in this contexts, and in related context, it is meant that when rotated around central axis Z, projection 38 only fully aligns with itself in one rotational orientation, i.e., after 360° rotation.

For the example shown, gap 75 is through a portion of straight side section 126.

The particular flange 38 shown, has a D-shape; i.e., a D-shaped inner definition and outer perimeter. In the particular example shown, straight side 126 is directed toward handle 95 and handle aperture 96, and includes gap 75 therethrough.

In general terms, the perimeter shape of projection 38 can be provided in a variety forms, preferably none of which is radially symmetric. By this, again, it is meant that to overlap itself and define the same perimeter, the projection 38 would need to be rotated a full 360° around central axis Z (FIG. 3). The "D" shape selected, is one of a variety of potential shapes. The "D" shape also provides for an ornamental appearance, as well as a distinctive designator indicating the company "Donaldson," the assignee of the present application.

Still referring to FIG. 8, within interior 30 of cartridge 5, adjacent aperture arrangement 35 and projecting downwardly therefrom, are spaced rib projections 130, each of which is directed generally radially inwardly, from the remainder of inner support 40. It can be seen, referring to FIG. 9, that these rib projections 130 generally project inwardly, in uninterrupted extension, between end piece 70 and opposite end piece 100, although alternatives (for example discontinuous extension) is possible in some instances.

Figure 9:
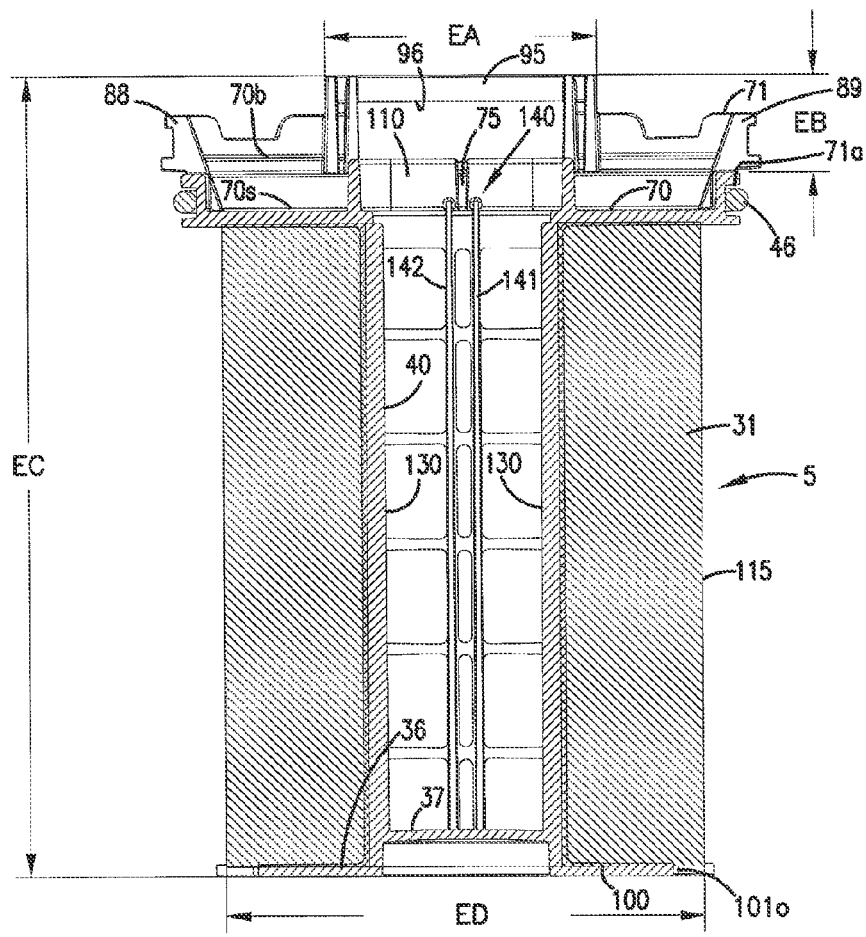
FIG. 9 is a schematic cross-sectional view of the cartridge depicted in FIG. 7, taken generally along line 9-9, of FIG. 8.

Still referring to FIGS. 8 and 9, in addition, cartridge 5, in particular support piece 110, further includes a double rib arrangement 140 comprising a pair of spaced ribs 141, 142, positioned depending from end piece 70 in extension to end piece 100, from locations on opposite sides of gap 75.

Ribs 130, of double rib arrangement 140, and ribs 130 will strengthen central support region 140 and will facilitate rotational indexing of a portion of access cover assembly 4 with cartridge 5 and housing base 3.

C. The Access Cover Assembly 4 of FIGS. 11-16.

Figure 11:
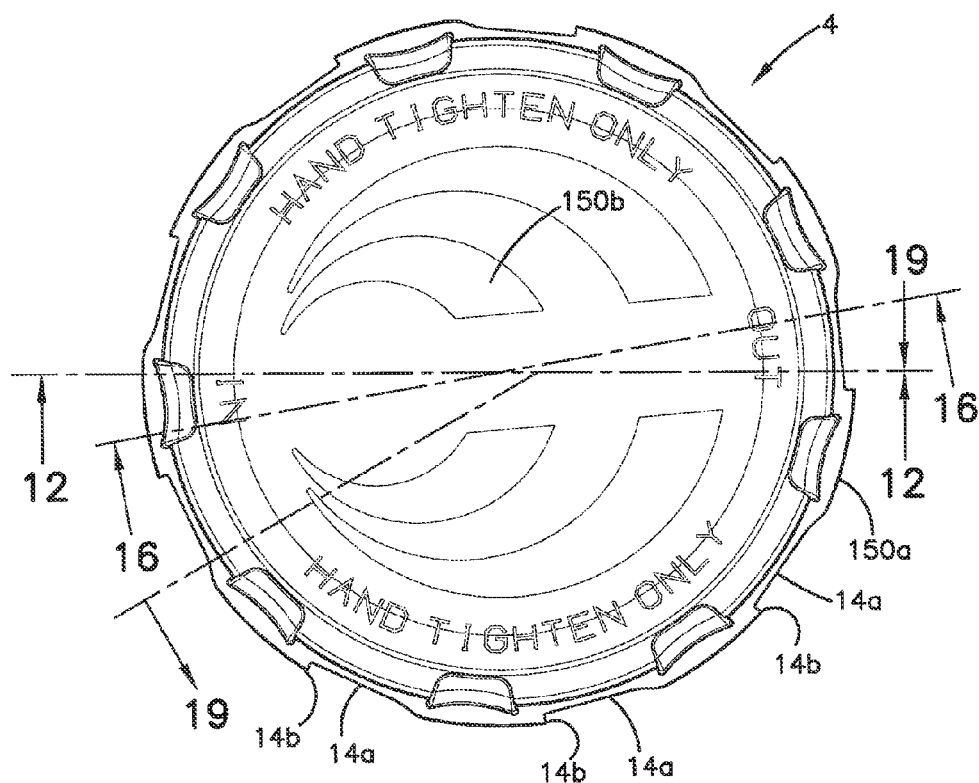
FIG. 11 is a schematic top plan view of a cover assembly component of the filter assembly depicted in FIGS. 1-4.
Figure 13:
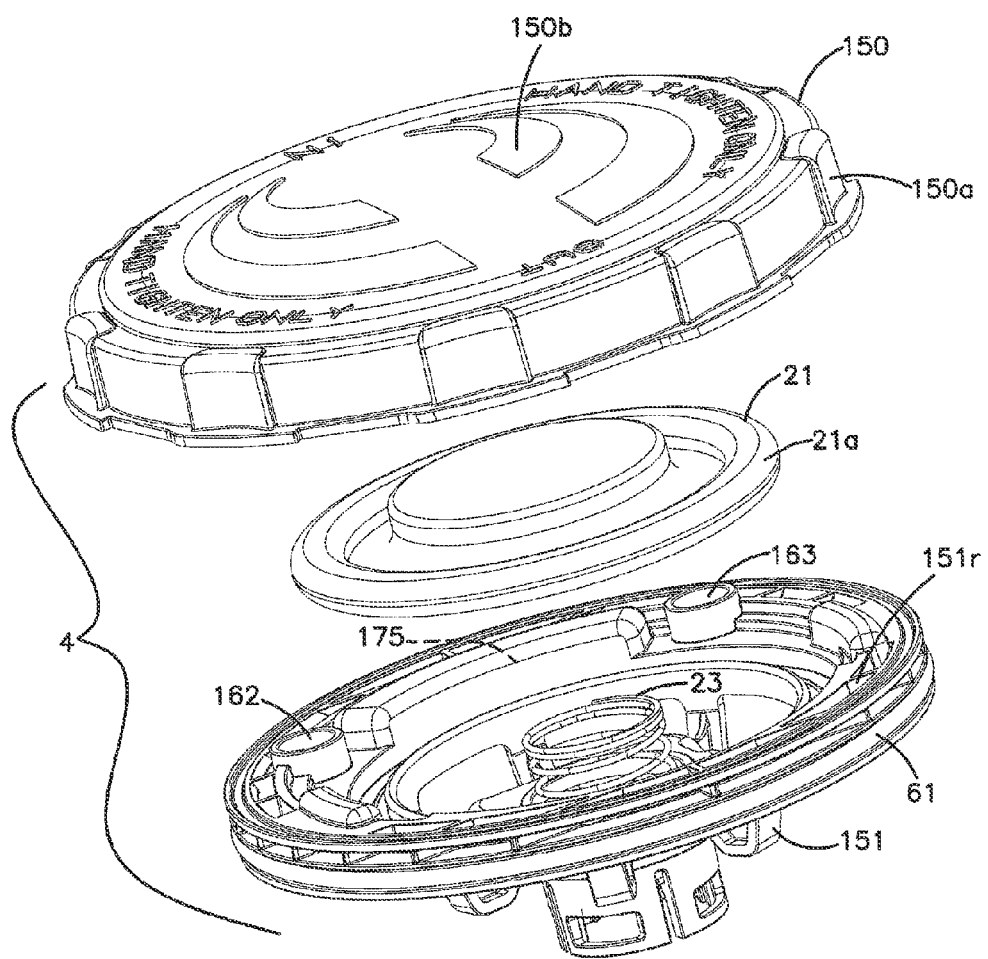
FIG. 13 is a schematic, exploded, top perspective view of the cover assembly of FIG. 11.

Referring to FIG. 11, a top plan view of access cover assembly 4 is provided. Referring to FIG. 13, an exploded, top, perspective view of cover assembly 4 is shown, indicating that the cover assembly 4 includes a top or cover member 150, regulator valve assembly diaphragm 21, coiled spring 23, and lower basket arrangement 151. O-ring 61 is also viewable.

Figure 16:
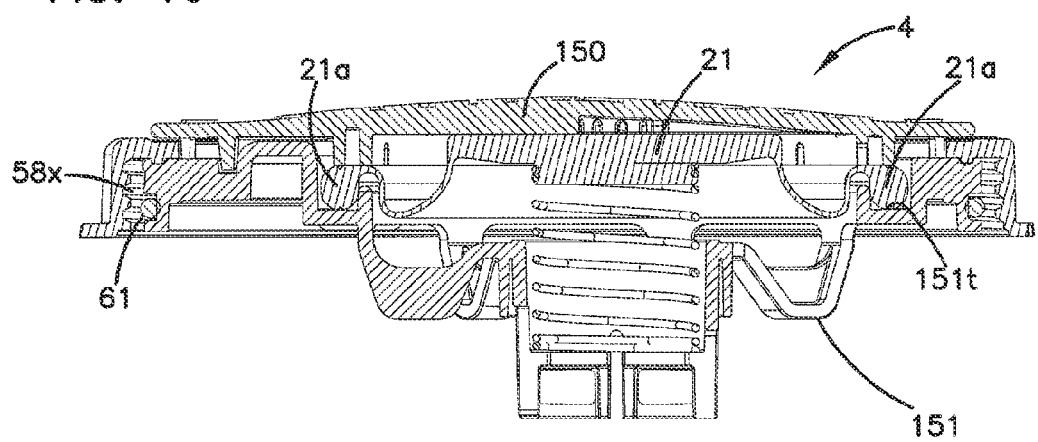
FIG. 16 is a schematic cross-sectional view of the cover assembly of FIGS. 11-15, taken generally along line 16-16 of FIG. 11.

Referring to FIG. 16, cover or cover assembly 4 is depicted in cross-section. Cover or cover assembly 4 depicted, includes cover member 150 secured to lower basket 151, with diaphragm 21 positioned therebetween. Specifically, diaphragm 21 includes an outer peripheral bead 21*a* secured between portion of cover member 150 and a portion of lower basket 151. In particular, bead 21*a* is positioned in bead trough 151*t* of lower basket 151.

Still referring to FIG. 16, o-ring 61 is shown positioned around a portion of lower basket member 151, for sealing against surface 59, FIG. 3A, when threads 58*x* of cover or cover assembly 4 is threaded on to threads 58 of base 3.

Figure 18:
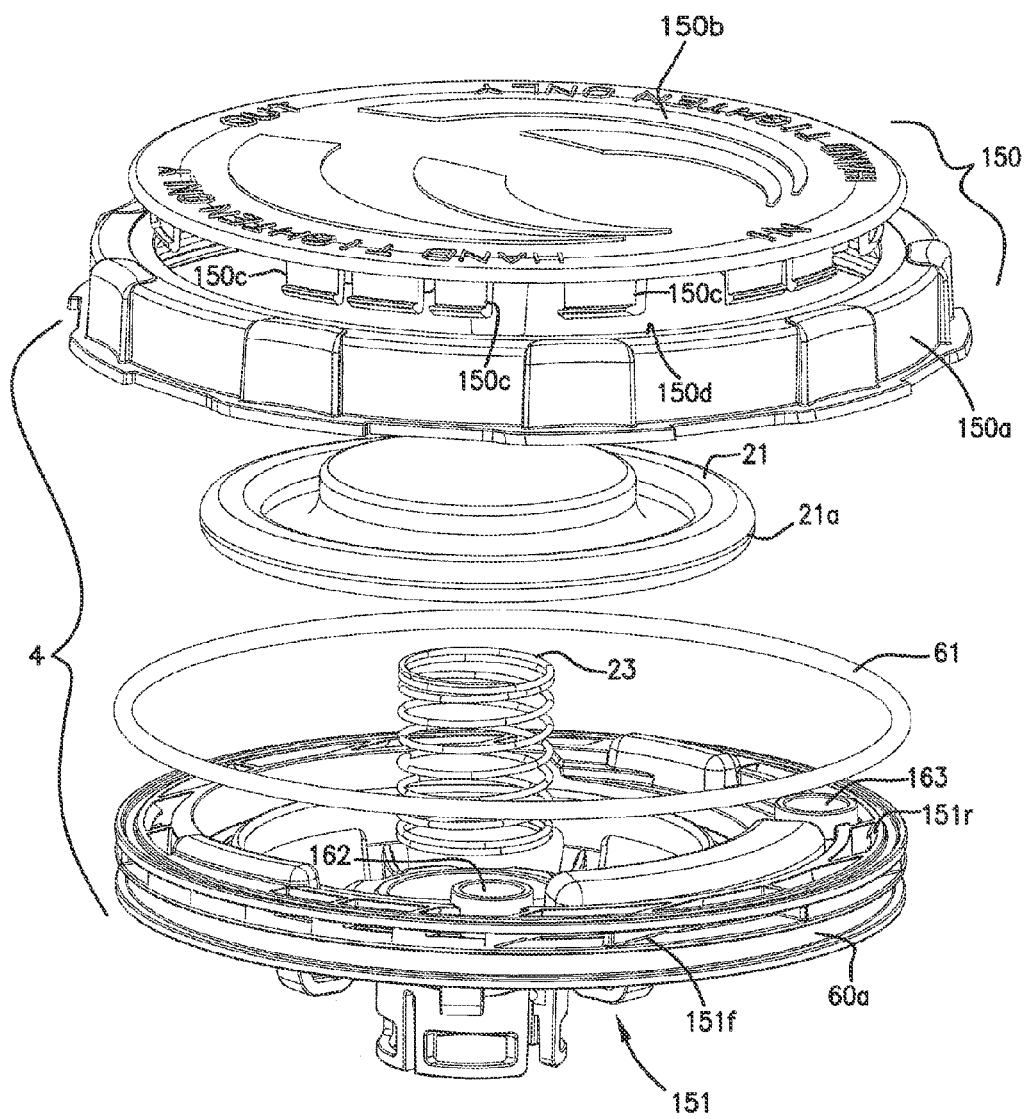
FIG. 18 is a schematic, second, top exploded perspective view of the cover component of an assembly according to FIGS. 1-4.

In FIG. 18, it can be seen that cover member 150 comprises an assembly including rim 150*a* and cap member or cap 150*b*. For the assembly of cover assembly 4, cap member 150*b* is pressed against rim 150*a* with snap-fit projections or hooks 150*c* projecting through aperture 150*d*.

Figure 19:
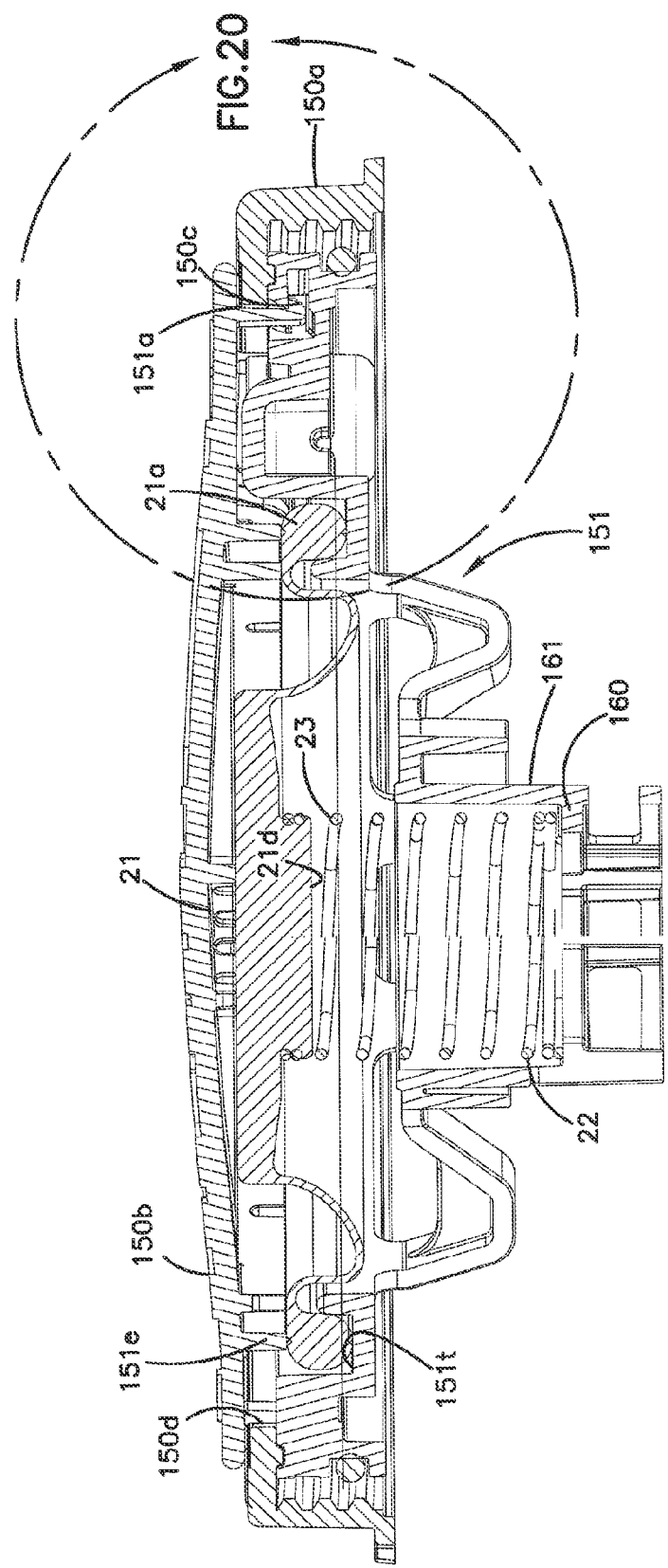
FIG. 19 is a schematic, enlarged, cross-sectional view taken in accord with line 19-19, FIG. 11.

Referring to FIG. 19, a cross-sectional view taken along line 19-19, FIG. 11, snap-fit hooks 150*c*, during assembly, will project through aperture 150*d* to engage a portion of lower basket assembly 151, in particular a portion of upper rim 151*a*. As a result of this engagement, there is no interfering connection between cap 150*b* and rim 150*a*. Further there is no interfering connection between rim 150*a* and basket arrangement 151. Thus rim 150*a* can rotate independently of cap 150*b* and lower basket member 151.

In general terms, the access cover assembly 4 includes a snap-fit projection arrangement, for securing cap member 150*b* to basket member 151. The snap-fit projection arrangement, in the example shown, comprises a plurality of snap-fit projection 150*c* on the cap member 150*b*.

Referring to FIG. 18, hooks 150*c* are generally positioned to engage rim portion 151*r* in such a matter that the hooks 150*c* become positioned on opposite sides of various ones of flanges 151*f*. Flanges 151*f* will inhibit rotation of the cap member 150*b* relative to lower basket member 151.

Referring to FIG. 19, outer bead 21*a* of diaphragm 21 is secured in place between projection 150*e* on member 150*b*, and receiving groove 151*t* on lower basket member 151. The positioning of diaphragm 21 in this manner, is conducted with biasing member 22, i.e., coiled spring 23, secured from a location around a downward projection 21*d* in the center of diaphragm 21, and spring receiver shelf 160 in center piece 161 of lower basket member 151.

In general, referring to FIG. 18, a cap member-to-basket member (or basket member-to-cap member) rotational alignment indexing arrangement is provided, to provide selected, indexed, rotational engagement between cap 150*b* and lower basket 151. As described above, the cap member-to-basket member rotational alignment indexing arrangement, for example in assembly 1 depicted, in part comprises snap-fit hooks 150*c* engaging a portion of rim 151*r* such that the flanges 151*f* are positioned between selected hooks 151*c*, to inhibit rotation of cap 150*b* relative to lower basket member 151.

In addition, in FIG. 18, lower basket 151 can be seen as including upwardly projecting receivers 162, 163. The receivers 162, 163 are rotationally spaced, but are spaced apart, on center in a shorter radial direction by an amount less than 180°. That is, they are rotationally, asymmetrically, positioned on member 151.

Figure 14:
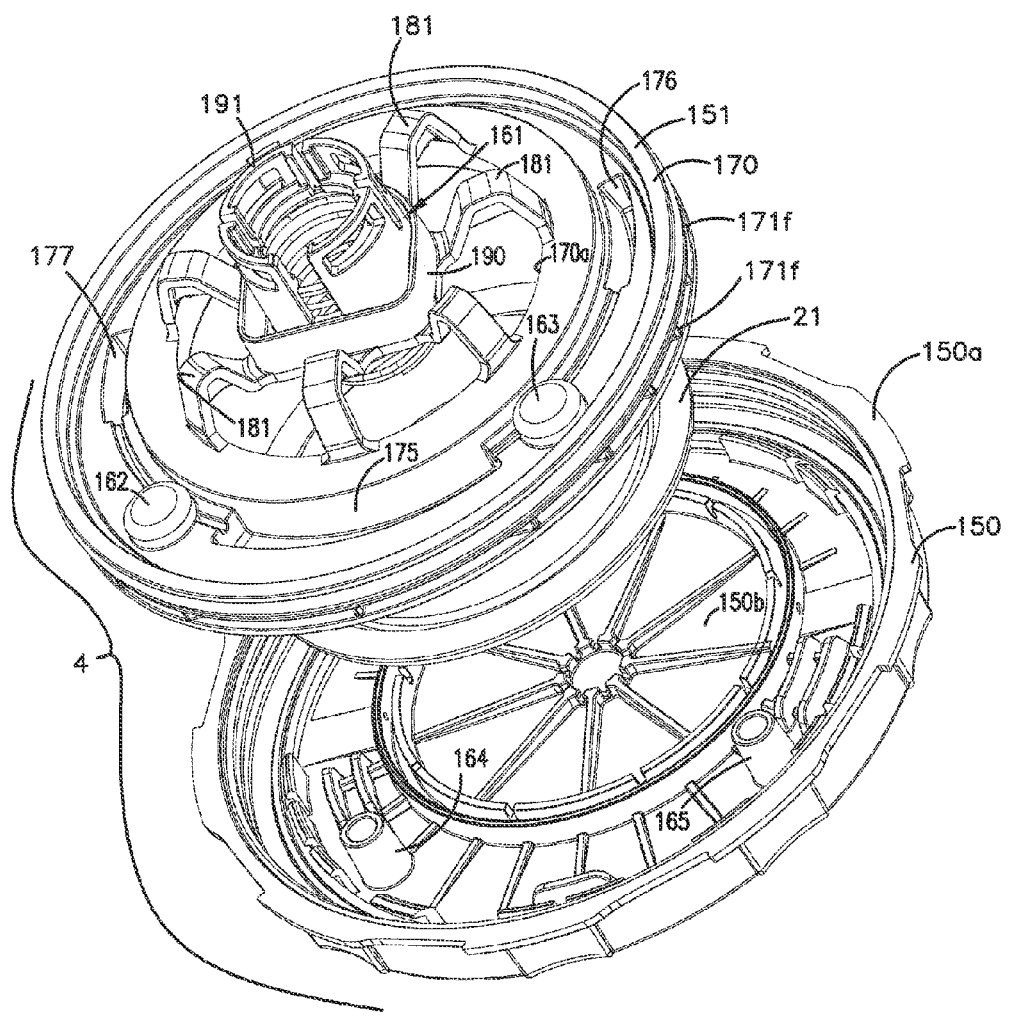
FIG. 14 is a schematic, bottom exploded perspective view of the cover assembly of FIG. 11.

Referring now to FIG. 14, an exploded, bottom, perspective view of cover assembly 4, can be seen that cap member 150*b* includes projecting therefrom, in a direction toward basket member 151, a pair of spaced projections 164, 165. The projections 164, 165 are radially spaced on center by, in a shorter direction, a spacing of less than 180°; i.e., projections 164, 165 are non-radially symmetrically spaced on cap 150*b*. On center radial spacing between projections 164, 165 is the same as the spacing between receivers 162, 163, FIG. 18. When the cover assembly 4 is fully assembled, projections 164, 165 project into, and are received by, receivers 162, 163, respectively. The engagement between the projections 164, 165 and the receivers 162, 163, helps provide for a maintained rotational alignment between base 150*b* and basket arrangement 162, 163. In addition, the projection/receiver arrangement represented by projections 164, 165 and receivers 162, 163, provides for convenient alignment, during an assembly process, to ensure the cap 150*b* is appropriately aligned with respect to the lower basket 151.

In more general terms, the cover assembly 4 includes a cap member-to-basket member (or basket member-to-cap member) rotational alignment indexing arrangement including a projection/receiver arrangement. The projection/receiver arrangement includes a first projection member on one of the cap 150*b* and basket 151; and a second receiver member on a second one of the cap 150*b* and basket 151. For the example described, the projection member is on the cap 150*b*, and comprises snap-fit hooks 150*c* and first and second projection members 164, 165; and, the receiver member is positioned on the basket 151 comprises a space under rim 151*r*, flanges 151*f* and first and second receivers 162, 163. The projection/receiver arrangement operates to provide a cap member-to-basket member rotation alignment indexing arrangement, which ensures that the cap member 150*b* can only be positioned in engagement with the basket member 151 in a single, selected, rotational orientation, in which it will remain.

Figure 14A:
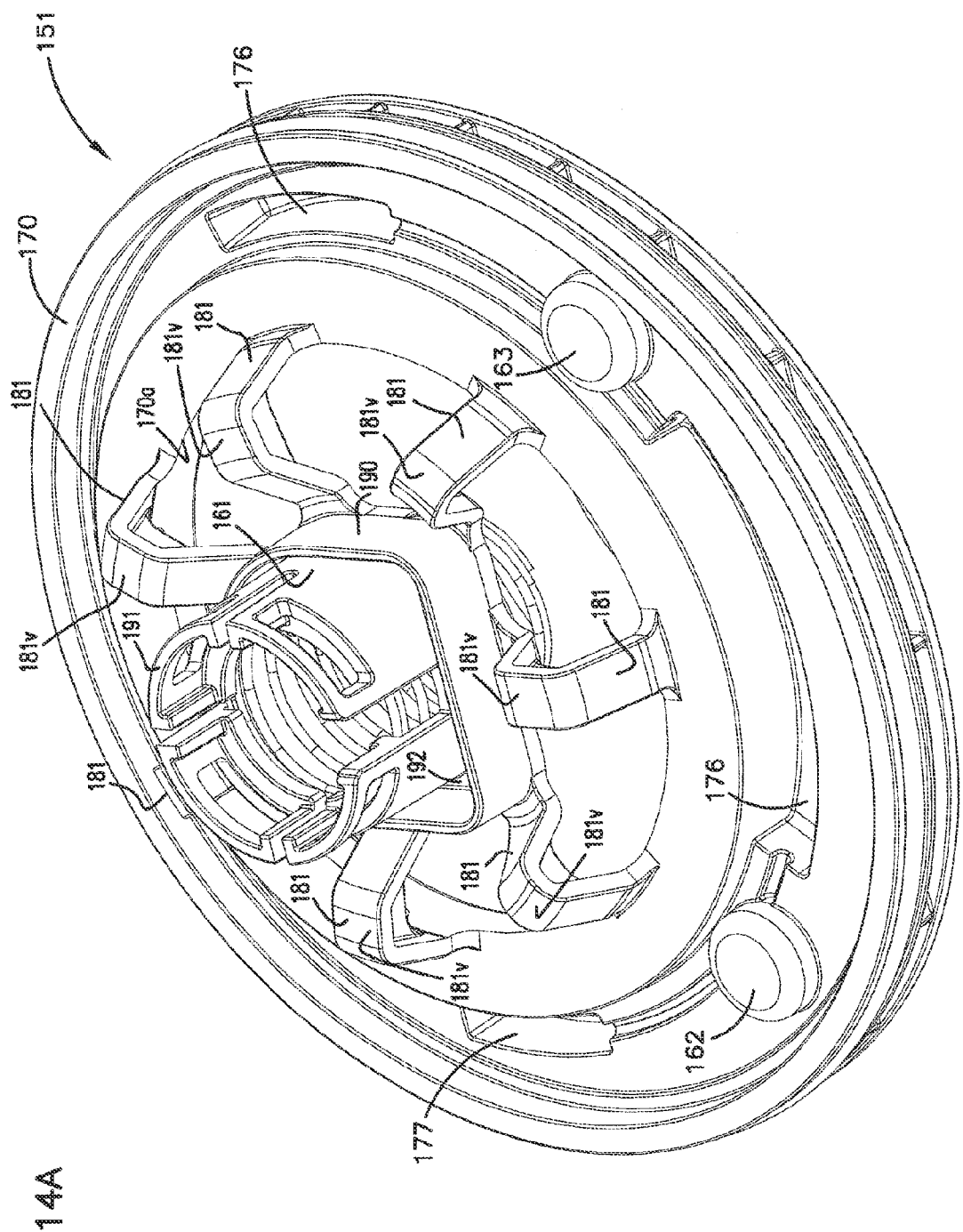
FIG. 14A is a schematic, enlarged view of a component depicted in FIG. 14.
Figure 14B:
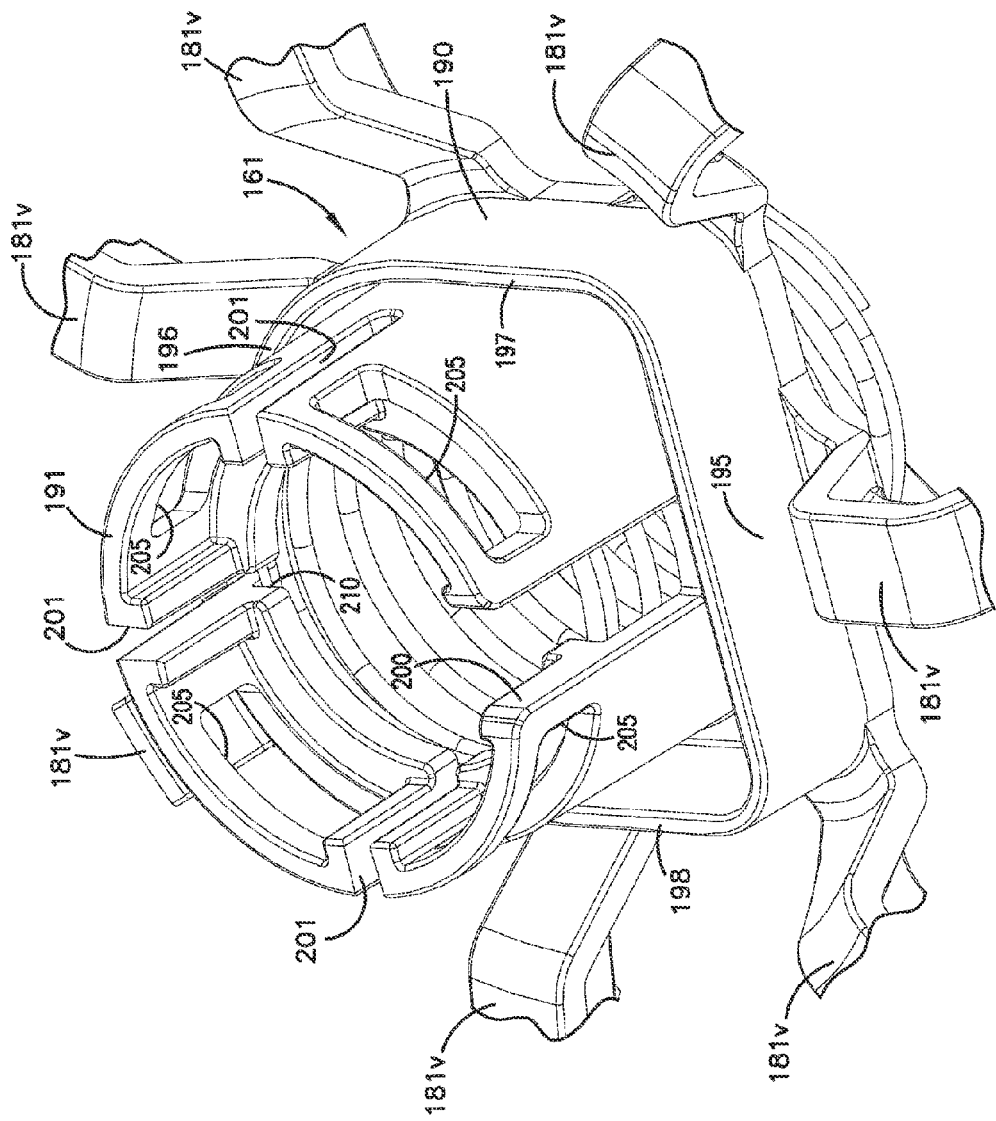
FIG. 14B is a schematic, enlarged fragmentary view of a portion of the component depicted in FIG. 14A.

Still referring to FIG. 14, basket member 151 includes an outer ring section 170. The outer rim section 170 includes rim 151*r* (FIG. 13) and receivers 162, 163 therein. In FIG. 14A, an enlarged view of basket member 151 is depicted, directed toward a side that is directed downwardly, in use. In FIG. 14B, an enlarged fragmentary view of a portion of FIG. 14A is depicted.

The outer ring section 170 (FIG. 14A) includes therein slot receivers 175, 176 and 177. Slot receiver 175 is positioned radially between slot receivers 176, 177. Slot receiver 175 is sized and oriented to receive handle 95 projecting upwardly therein, when cover 4 is appropriately positioned on housing base 3, with a cartridge 5 in place. Receivers 176, 177, are positioned to receive one each of the ear projections 80, therein, during positioning of cover assembly 4 on base 5, with cartridge 5 in place.

Still referring to FIG. 14A, lower basket member 151 includes outer ring 170 and center member 161. The outer ring 170 defines central aperture 170*a*. The center member 161 is secured to the rim 170 (depending downwardly in use from aperture 170*a*), by spaced legs 181. Each leg 181 is a generally u-shaped, with a central vertex 181*v* which is directed downwardly when cover assembly 4 is installed on housing base 3. The number of legs 181 is a matter of choice, for a selected assembly. Typically there will be at least three legs 181, not more than nine legs 181. For the example shown there are seven, evenly spaced, legs 181.

Referring to FIG. 3A, the central vertex 181*v* of the legs 181 is directed downwardly to engage surface portion 70*s* of end cap 70, of assembly 1. Spacing between the legs 181 facilitates air and liquid flow to interior 30 of cartridge 5.

Referring again to FIG. 14A, the center member 161 includes an outer rim projection 190 and a central depending tubular member 191. The outer rim projection 190 is spaced from the central, depending, tubular member 191, to define a slot 192 therebetween.

Attention is now directed to FIG. 14B (an enlarged, fragmentary, view of a portion of FIGS. 14 and 14A) and in particular to the outer rim projection 190. The projection 190 has a non-circular shape. The shape of projection 190 should match (but for size) the shape of projection 38, FIGS. 7 and 8. Thus for the example shown, projection 190 has a D-shape with a straight side 195 and an opposite curved side 196. For the example shown, projection 190 also has a pair of opposite straight sections 197, 198 extending between sides 195, 196.

In more general terms, projection 190 preferably defines a perimeter shape which must be rotated 360° (one complete time) around central axis Z, FIG. 3A, to realign (overlap) with itself. The "D" shape selected, is to match the projection 38. Typically one of projections 38, 190 will be larger than the other one of projections 190, 38, so that one can nest within the other.

For the example shown, FIG. 3A, with cover assembly 4 positioned on base 3, and with the cartridge 5 installed, projection 38 on piece 70 receives projecting therein, and also surrounds, projection 190. This is shown in FIG. 3A. Preferably there is a surface-to-surface engagement between inner surface 38*i*, FIG. 7, of projection 38 and outer surface 190*o*, FIG. 14, of projection 190. Such a snug fit will inhibit gas flow between the two parts (38, 190). Preferably gas flow into interior 30 of cartridge 5 enters by air passing over flange 38 and projection 190. This facilitates operation of the regulator valve arrangement 20.

Clearance along a bottom end 138*b* (FIG. 3A) of projection 38 and tip 190*t* of projection 190 should be sufficient, to allow some liquid flow through gap 75, into interior 30 of an installed cartridge. Such a flow gap for liquid would generally be insufficiently large with respect to allowing gas flow, to disable operation of the regulator valve assembly 20.

Typically, a gap or clearance of at least 0.3 mm in this region is sufficient. Typically the gap or clearance will typically be about 1 mm-5 mm, for example 2-5 mm. In FIG. 3A, this gap, which is located at 30*g*, is shown on the shorter or smaller side, but will typically be larger.

Alternately stated, typically projection 190 is sufficiently shorter than projection 30*a*, such that projection 190 projects into projection 30*a* a short distance, leaving a gap of at least 0.3 mm, typically at least 1 mm and often on the order of 2-5 mm, for example 4 mm, between an end projection 190 and a bottom end of projection 30*a*, adjacent aperture arrangement 35.

Referring again to FIG. 14B, center member 191 is generally tubular, with a circular outer periphery. Member 191 includes gap 200 therein. The gap 200 is sized to receive double rib 140, comprising ribs 141, 142, FIG. 8, therein, when cover assembly 4 is installed on housing base 3, with cartridge 5 received therein. As a result of this engagement, gap 200 will align with gap 75, allowing liquid flow from surface 70s into aperture 35 and interior 30 of cartridge 5 (FIG. 3).

In addition to gap 200, FIG. 14B member 191 includes spaced receivers or slots 201. The receivers 201 are positioned to align with, and receive, ribs 130, FIG. 8, when cover assembly 4 is positioned on housing base 3, with cartridge 5 installed.

Still referring to FIG. 14B, apertures 205 in member 191 provide gas flow passage into media 31. Along an interior of piece 191, support shelf 210 is provided, to contain coiled spring 23.

From the above, it will be understood the assembly 1 is configured for a single, defined, rotational alignment of base 3, cartridge 5, basket member 151 and cap 150b. When properly assembled, cap 150b will be oriented with designator 10x, i.e., "IN" aligned with inlet 10, FIG. 2, and with designator 12x, i.e., "OUT" FIG. 2, aligned with outlet 12. As a result of indexing provided by projections 164, 165, receivers, 162, 163, snap-in projection 150c and flanges 151t, there will be simultaneous rotational orientation of basket member 151 within assembly 1. The orientation will be with receiver 175 receiving handle 95, receivers 177, 176 receiving the ears 80, and with D-shaped flange 190 received inside of and preferably in side surface (gas flow inhibition) engagement with, projection 38 of cartridge 5. (The cartridge 5 is rotationally fixed as a result of engagement between receivers 90, 91 and ears 80).

In general, the cover member 4 will not be able to press downwardly into a secure engagement, unless receiver 200 in center projection member 191, is aligned with gap 75 and double rib arrangement 140.

Figure 12:
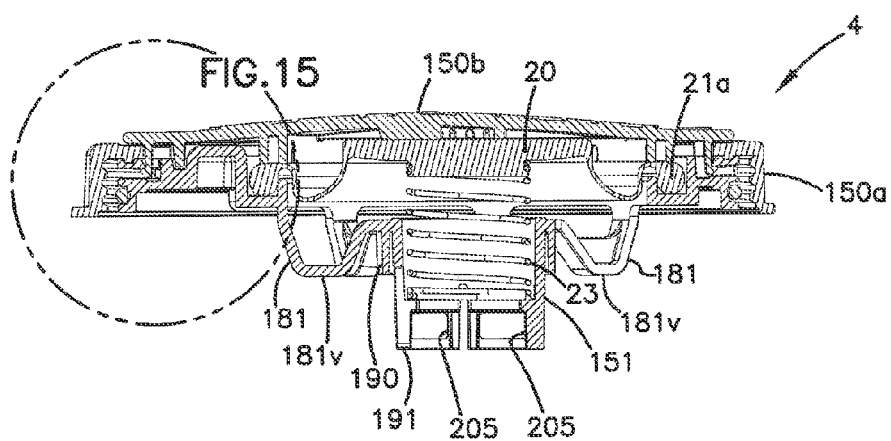
FIG. 12 is a schematic cross-sectional view of the cover assembly of FIG. 11, taken generally along line 12-12 thereof.

Attention is directed to FIG. 12, a cross-sectional view taken along line 12-12, FIG. 11. In FIG. 12, assembly 4 can be seen in cross-sectional view, with center member 191 spaced from D-shaped projection 190 and with spaced legs 181 oriented with vertices 181v directed downwardly, as would be typical during assembly.

Figure 15:
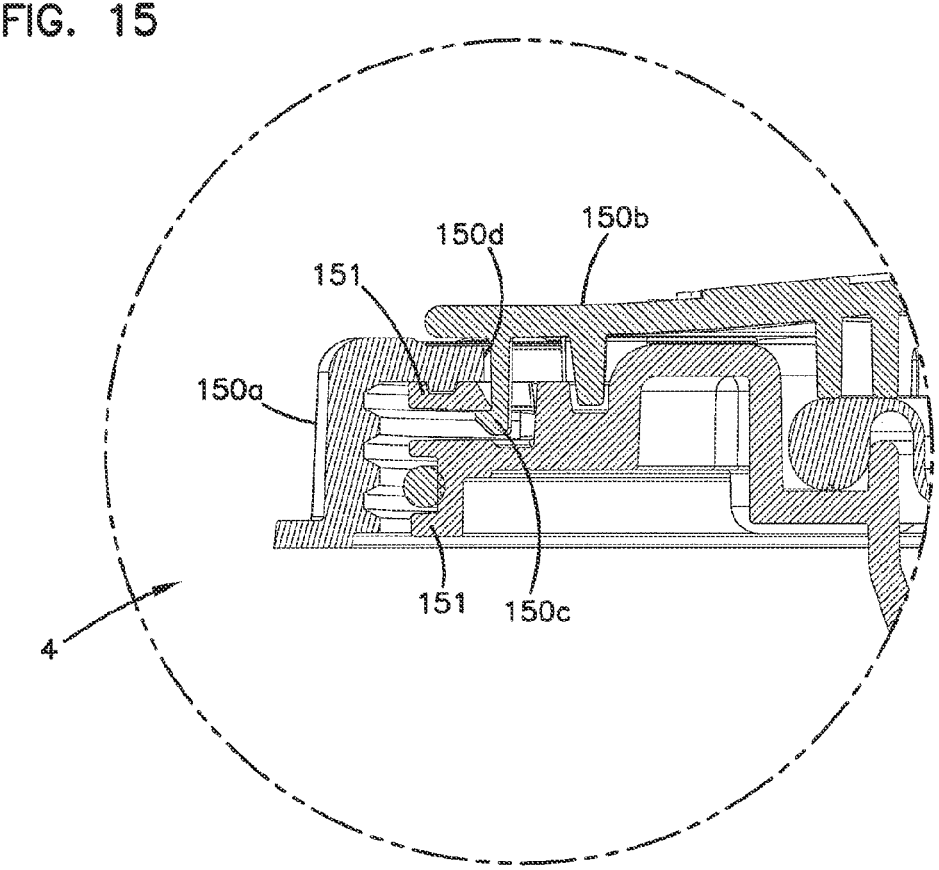
FIG. 15 is a schematic, enlarged fragmentary view of a portion of FIG. 12.

In FIG. 15, an enlarged fragmentary view of a portion of FIG. 4 is shown. Here, snap-fit projection 150c extending through aperture 150d to engage a portion of basket member 151 can be seen. Rim 150a will be understood to be rotatable, relative to cap 150b and basket member 151.

In FIG. 13, cover assembly 4 is shown in a partially exploded view, depicting cover member 150 (assembled), basket member 151, and diaphragm 121 between cover member 150 and basket member 121.

Figure 20:
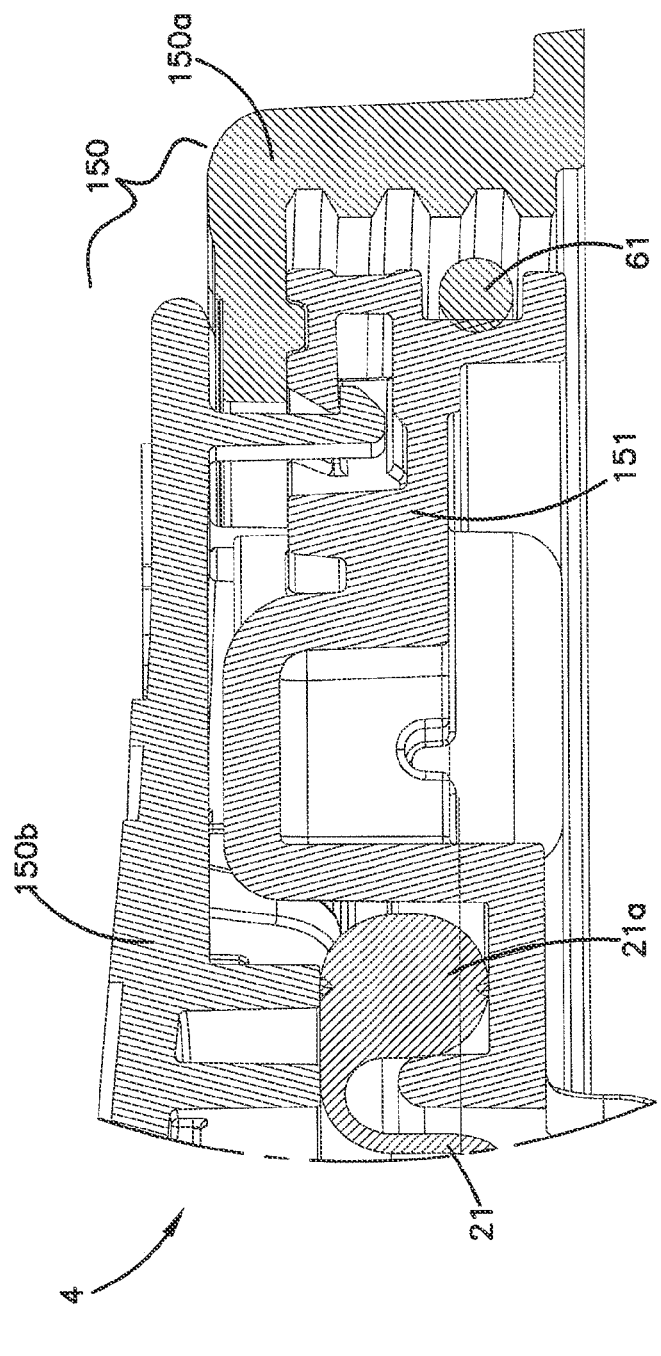
FIG. 20 is schematic, enlarged, fragmentary view of the portion of FIG. 19.

FIG. 20 is an enlarged fragmentary view of a portion of FIG. 19. Features of cover assembly 4 are viewable.

D. Example Dimensions; Materials.

In the examples depicted in FIGS. 1-20, example dimensions are provided for a further understanding of the disclosure. In the figures, the indicated dimensions are as follows: In FIG. 1, AA=122.3 mm; AB=15.5 mm; AC=19.0 mm; AD=19.0 mm; AE=42 mm; AF=164.7 mm; AG=12.3 mm; AH=93.6 mm; and, AI=142 mm. In FIG. 2, BA=168 mm; BB=64 mm; BC=126.4 mm; and, BD=171 mm. In FIG. 3, CA=164.7 mm; CB=120 mm; and, CC=135.5 mm. In FIG. 8, DA=86.1 mm diameter. In FIG. 9, EA=42.1 mm; EB=15.2 mm; EC=124.5 mm; and, ED=73.7 mm. Other dimensions can be taken from scale, except, as characterized above, in FIG. 3A, projection 190 depicted extending further into projection 30a than would be typical and preferred, usually a gap of at least 1 mm, typically at least 2 mm, and, for example, on the order of about 4 mm will be left between the tip of projection 190 and the base of projection 38.

Of course alternative dimensions can be used with the current principles.

A variety of materials can be used for the structural materials, and typically are a matter of a choice.

Typically for the housing base 3, a plastic will be chosen, for example a glass-filled (33%) nylon 66 or similar material. For the cover assembly 4, the cap member 150a and basket member 151, would typically comprise a molded plastic, for example nylon 66, glass-filled (33%). The rim member 150b will typically comprise an Acetal.

Within the cartridge 5, the support member 110 will typically comprise a molded plastic, for example a glass-filled (33%) nylon 66 or similar material can be used. The mounting arrangement 15 would typically comprise glass-filled (33%) nylon 66.

The media or media 31 is described in Section III below.

II. Example System, FIG. 21

Figure 21:
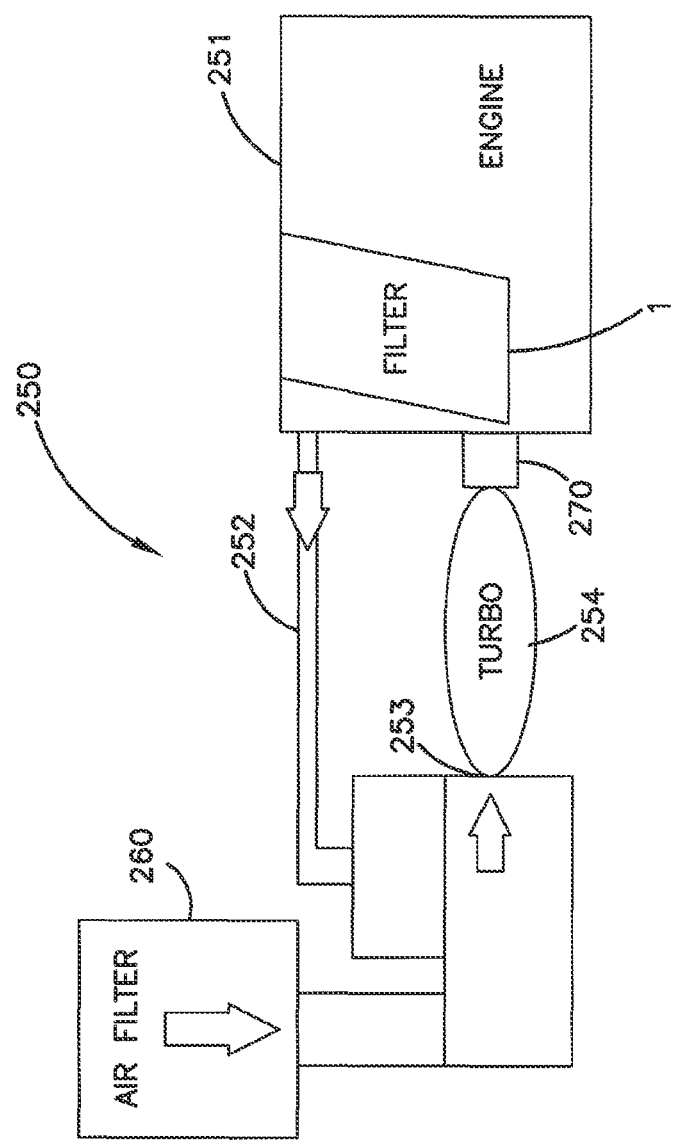
FIG. 21 is a schematic view of an equipment system including the filter assembly according to the present disclosure herein.

Attention is directed to FIG. 21, which shows an example system including a filter arrangement 1 according to the present disclosure. Referring to FIG. 21, the system 250 includes an engine 251. The filter assembly 1 is depicted, schematically, oriented to receive crankcase ventilation flow from the engine 251. At 252 off gases from the filter assembly 1, are shown directed ultimately to inlet 253 of turbo 254. In FIG. 21, an air cleaner arrangement 260 is shown, which provides for filtered ambient air flow to the turbo 254 in the engine 251.

Of course the off gases 252 can be directed elsewhere, for example into air cleaner 260, if desired.

In general, the system 250 depicted is "closed" in that filtered off gases from the filter arrangement 1 are not vented directly to the atmosphere, but rather are cycled back into the engine intake indicated generally at 270.

Although not shown, a typical system 250 would include pressure relief valve assembly ensuring that crankcase ventilation flow from the engine 251 is vented to the atmosphere, if the filter arrangement 1 or equipment downstream from filter arrangement, is sufficiently occluded to build up pressure to an otherwise (if not vented) undesirable level.

III. Useable Media

A. General Characteristics

The appropriate media, for the media pack, is selected for the conditions of use. Generally the media is selected to have appropriate properties with respect to: coalescing and drainage of liquid; and, filtering of gases passing therethrough with respect to particulates. Layers of media can be utilized for the media of the media pack. Example usable media described in U.S. Provisional Application Ser. No. 60/731,287, filed Oct. 28, 2005, PCT Application PCT/US2006/041738, filed Oct. 27, 2006, U.S. Provisional Application 60/656,806, filed Feb. 22, 2006; and, PCT Publication WO06/91594, published Aug. 31, 2006, and PCT Publication WO 2006/084282, published Oct. 19, 2006, each of which is incorporated herein by reference.

Typically the media will comprise a continuous, nonwoven, fibrous media.

An example useable media as described in U.S. provisional application 60/656,806 filed Feb. 22, 2005, incorporated herein by reference. Another example media is described in PCT Publication WO 05/083,240, published Sep. 9, 2005, and incorporated herein by reference. A third example media is described in U.S. provisional application 60/650,051 filed Feb. 4, 2005, incorporated herein by reference. The following description is of example media from U.S. provisional application 60/650,051, filed Feb. 4, 2005.

The media is typically a wet laid media is formed in a sheet form using wet laid processing, and is then positioned on/in the filter cartridge. Typically the wet laid media sheet is at least used as a media stage stacked in multiple layers.

As indicated, multiple layers, forming a gradient can be provided in a media stage, by first applying one or more layers of wet laid media of first type and then applying one or more layers of a media (typically a wet laid media) of a different, second, type. Typically when a gradient is provided, the gradient involves use of two or more media types which are selected for at least differences in efficiency.

Herein, it is important to distinguish between the definition of the media sheet used to form the media stage, and the definitions of the overall media stage itself. Herein the term "wet laid sheet," "media sheet" or variants thereof, is used to refer to the sheet material that is used to form the media extension of a filter, as opposed to the overall definition of the total media extension in the filter. This will be apparent from certain of the following descriptions.

Media extensions of the type of primary concern herein, are at least used for coalescing/drainage, although they typically also have particulate removal function and thus comprise a portion of an overall media stage that provides for both coalescing/drainage and desired removal efficiency of solid particulate removal.

Although alternatives are possible, an example media composition used to form a media extension in a CCV (crankcase ventilation) filter for coalescing/drainage is typically as follows:

1. Although alternatives are possible for different applications, it is typically provided in a form having a calculated pore size (X-Y direction) of at least 10 micron, usually at least 12 micron. The pore size is typically no greater than 60 micron, for example within the range of 12-50 micron, typically 15-45 micron.
2. It is typically formulated to have a DOPE % efficiency (at 10.5 fpm for 0.3 micron particles), within the range of 3-18%, typically 5-15%.
3. It typically comprises at least 30% by weight, typically at least 40% by weight, often at least 45% by weight and usually within the range of 45-70% by weight, based on total weight of filter material within the sheet, bi-component (binder) fiber material in accord with the general description provided herein.
4. It typically comprises 30 to 70% (typically 30-55%), by weight, based on total weight of fiber material within the sheet, of secondary fiber material having average largest cross-sectional dimensions (average diameter if round) of at least 1 micron, for example within the range of 1 to 20 micron. In some instances it will be 8-15 micron. The average lengths are typically 1 to 20 mm, often 1-10 mm. This secondary fiber material can be a mix of fibers. Typically polyester and/or glass fibers are used, although alternatives are possible.
5. Typically and preferably the fiber sheet (and resulting media extension) includes no added binder other than the binder material contained within the bi-component fibers. If an added resin or binder is present, preferably it is present at no more than about 7% by weight of the total fiber weight, and more preferably no more than 3% by weight of the total fiber weight.

Media in accord with the general definitions provided herein, including a mix of bi-component (binder) fiber and other fiber, can be used as any (and in some instances all) layer(s) of a media stage in a crankcase ventilation filter as generally described above. When used in this manner, it will typically be placed in multiple layers, although alternatives are possible. The overall efficiency can be calculated based upon the number of layers and the efficiency of each layer. For example the efficiency at 10.5 feet per minute (3.2 m/min) for 0.3 micron DOPE particles for media stage comprising two layers of wet laid media each having an efficiency of 12% would be 22.6%, i.e., 12%+0.12×88.

Typically enough media sheets would be used in the final media stage to provide the media stage with overall efficiency of at least 85%, typically 90% or greater. In some instances it would be preferred to have the efficiency at 95% or more. In the context the term "final media stage" refers to a stage resulting from wraps or coils of the sheet(s) of the media.

B. The Preferred Calculated Pore Size.

The media extension performs two important functions:
1. It provides for some coalescing and drainage of oil particles carried in the crankcase ventilation gases being filtered; and
2. It provides for selected filtration of other particulates in the gas stream.

In general, if the pore size is too low:
a. Drainage of coalesced oil particles by gravity, downwardly through (and from) the media, can be difficult or slowed, which leads to an increase of re-entrainment of the oil into the gas stream; and
b. Unacceptable levels of restriction are provided to the crankcase gas flow through the media.

In general, if the porosity is too high:
a. Oil particles are less likely to collect and coalesce; and
b. A large number of layers, and thus media thickness, will be necessary to achieve an acceptable overall level of efficiency for the media pack.

It has been found that for crankcase ventilation filters, a calculated pore size for media used to form media extension within the range of 12 to 50 micron is generally useful. Typically the pore size is within the range of 15 to 45 micron.

The term X-Y pore size and variants thereof when used herein, is meant to refer to the theoretical distance between fibers in a filtration media. X-Y refers to the surface direction versus the Z direction which is the media thickness. The calculation assumes that all the fibers in the media are lined parallel to the surface of the media, equally spaced, and ordered as a square when viewed in cross-section perpendicular to the length of the fibers. The X-Y pore size is a distance between the fiber surfaces on the opposite corners of the square. If the media is composed of fibers of various diameters, the $d^2$ mean of the fiber is used as the diameter. The $d^2$ mean is the square root of the average of the diameters squared.

It has been found, in some instances, that it is useful to have calculated pore sizes on the higher end of the preferred range, typically 30 to 50 micron, when the media stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm) A reason for this is that taller filter stages provide for a higher liquid head, during coalescing, which can force coalesced liquid flow, under gravity, downwardly through smaller pores, during drainage. The smaller pores, of course, allow for higher efficiency and fewer layers.

Of course in a typical operation in which the same media stage is being constructed for use in a variety of filter sizes, typically for at least a portion of the wet laid media used for the coalescing/drainage in initial separation, an average pore size of about 30-50 microns will be useful.

C. Solidity

Solidity is the volume fraction of media occupied by the fibers. It is the ratio of the fibers volume per unit mass divided by the media's volume per unit mass.

Typical materials preferred for use in media extension according to the present disclosure, have a percent solidity at 0.125 psi (8.6 milliards) of fewer than 10%, and typically fewer than 8%, for example 6-7%.

D. Preferred DOPE Efficiency at 10.5 ft/minute for 0.3 micron particles.

The preferred efficiency stated, is desirable for layers or sheets of media to be used to generate crankcase ventilation filters. This requirement indicates that a number of layers of the wet laid media will typically be required, in order to generate an overall desirable efficiency for the media stage of typically at least 85% or often 90% or greater, in some instances 95% or greater.

The reason a relatively low efficiency is provided in any given layer, is that it facilitates coalescing and drainage and overall function.

In general, DOPE efficiency is a fractional efficiency of a 0.3 micron DOPE particle (dactyl phthalate) challenging the media at 10 fpm. A TSAR model 3160 Bench (TSAR Incorporated, St. Paul, Minn.) can be used to evaluate this property. Model dispersed particles of DOPE are sized and neutralized prior to challenging the media.

E. The Media Composition.

1. The Bi-Component Fiber Constituent.

As indicated above, it is preferred that the fiber composition of the media include 30 to 70%, by weight, of bi-component (binder) fiber material. A major advantage of using bi-component fibers in the media, is effective utilization of fiber size while maintaining a relatively low solidity. With the bi-component fibers, this can be achieved while still accomplishing a sufficiently high strength media for handling installation in crankcase ventilation filters. Also, the bi-component fibers are binder fibers.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, in forming the wet laid media. Melting of the first polymer component of the bi-component fiber is necessary to allow the bi-component fibers to form a tacky skeletal structure, which upon cooling, captures and binds many of the other fibers, as well as other bi-component fibers.

Although alternatives are possible, typically the bi-component fibers will be formed in a sheath core form, with a sheath comprising the lower melting point polymer and the core forming the higher melting point.

In the sheath-core structure, the low melting point (e.g., about 80 to 205° C.) thermoplastic is typically extruded around a fiber of the higher melting point material (e.g., about 120 to 260° C.). In use, the bi-component fibers typically have a average largest cross-sectional dimension (average fiber diameter if round) of about 5 to 50 micrometer often about 10 to 20 micrometer and typically in a fiber form generally have an average length of at least 1 mm, and not greater than 30 mm, usually no more than 20 mm, typically 1-10 mm. By "largest" in this context, reference is meant to the thickest cross-section dimension of the fibers.

Such fibers can be made from a variety of thermoplastic materials including polyolefin's (such as polyethylene's, polypropylenes), polyesters (such as polyethylene terephthalate, polybutylene terephthalate, PCT), nylons including nylon 6, nylon 6, 6, nylon 6, 12, etc. Any thermoplastic that can have an appropriate melting point can be used in the low melting component of the bi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefin/polyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bi-component fiber known as 271P available from DuPont. Others fibers include FIT 201, Kuraray N720 and the Nichimen 4080 and similar materials. All of these demonstrate the characteristics of cross-linking the sheath polymer upon completion of first melt. This is important for liquid applications where the application temperature is typically above the sheath melt temperature. If the sheath does not fully crystallize then the sheath polymer will remelt in application and coat or damage downstream equipment and components.

An example of a useable bi-component (binder) fiber for forming wet laid media sheets for use in CCV media is Dupont polyester bi-component 271P, typically cut to a length of about 6 mm.

2. The Secondary Fiber Materials.

The bi-component fibers provide a matrix for the crankcase ventilation filter media. The additional fibers or secondary fibers, sufficiently fill the matrix to provide the desirable properties for coalescing and efficiency.

The secondary fibers can be polymeric fibers, glass fibers, metal fibers, ceramic fibers or a mixture of any of these. Typically glass fibers, polymeric fibers or a mixture are used.

Glass fibers useable in filter media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers.

Non-woven media of the invention can contain secondary fibers made from a number of both hydrophilic, hydrophobic, oleophilic, and oleophobic fibers. These fibers cooperate with the glass fiber and the bi-component fiber to form a mechanically stable, but strong, permeable filtration media that can withstand the mechanical stress of the passage of fluid materials and can maintain the loading of particulate during use. Secondary fibers are typically monocomponent fibers with average largest cross-sectional dimension (diameters if round) that can range from about 0.1 on up, typically 1 micron or greater, often 8-15 microns and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be used, to obtain certain desired efficiencies and other parameters.

The sheet media of the invention are typically made using papermaking processes. Such wet laid processes are particularly useful and many of the fiber components are designed for aqueous dispersion processing. However, the media of the invention can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. For a commercial scale process, the bi-component mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bi-component mat of the invention can be prepared by forming pulp and glass fiber slurries and combining the slurries in mixing tanks, for example. The amount of water used in the process may vary depending upon the size of the equipment used.

The furnish may be passed into a conventional head box where it is dewatered and deposited onto a moving wire screen where it is dewatered by suction or vacuum to form a non-woven bi-component web.

The binder in the bi-component fibers is activated by passing the matt through a heating step. The resulting material can then be collected in a large roll if desired.

3. Surface Treatments of the Fibers.

Modification of the surface characters of the fibers, increase in the contact angle, can enhance drainage capability of filtration media and thus the formed elements of the filter (with respect to pressure drop and mass efficiency). A method of modifying the surface of the fibers is to apply a surface treatment such as a flourochemical or silicone containing material, typically up to 5% by weight of the media.

The surface treatment agent can be applied during manufacture of the fibers, during manufacture of the media or after manufacture of the media post-treatment, or after provision of the media pack. Numerous treatment materials are available such as flourochemicals or silicone containing chemicals that increase contact angle. An example is the DuPont Zonyl™ flourochemicals, such as #7040 or #8195.

IV. General Comments and Observations

Herein, a variety of techniques, features and components, useable for crankcase ventilation filtration, are described. There is no specific requirement that an apparatus or technique involved use all of the features and techniques specifics characterized, in order to obtain some benefit of the teachings of the present disclosure.

In one aspect, the present disclosure relates to a provision of a filter cartridge for use in separating hydrophobic aerosol phase from the gas stream, and to filter the gas stream. The filter cartridge generally comprises a media pack and a first end piece adjacent the media pack. The media pack includes filtration media surrounding an open interior and including first and second opposite ends. The first end piece is positioned adjacent the first end of the media pack, and has a first, outer, surface on an opposite side of the first end piece from the media pack. The first end piece includes a perimeter housing seal arrangement thereon, for example an o-ring seal. The first end piece includes a central flow aperture arrangement projecting therethrough, into flow communication with the open interior of the media pack. The first end piece also includes a non-circular projection surrounding the central flow aperture arrangement. The non-circular projection is positioned to project from an opposite side of the first end piece from the media pack. The direction of extension is thus generally in a direction axially opposite the media pack. By "axially opposite" in this context, it is meant in a direction generally in the same direction as a central axis of the media pack extending through the open interior, but in a direction away from the media pack. When it is said that the piece extends in a direction "axially opposite the media pack," it is not meant that the non-circular projection extends necessarily precisely parallel to the central axis of the media pack.

The non-circular projection is spaced inward from an outer perimeter or perimeter rim of the end piece.

In general, the "non-circular projection" generally has a radially asymmetric shape. By the term "radially asymmetric" and variants thereof, in this context, it is meant if rotated around a central axis, the projection shape is such that it will only align with itself after a complete (i.e., 360°) rotation.

Typically the non-circular projection includes an outer perimeter with first straight side portion and an opposite curved side portion. An example is shown in which the non-circular projection comprises a D-shaped outer perimeter.

Typically, the non-circular projection is non-continuous and includes a liquid drain gap arrangement extending through a sidewall thereof. In an example shown, the drain gap arrangement comprises a gap in the first straight side portion of the non-circular projection, opposite the curved side portion.

In accord with principles described herein, the cartridge may include a handle member positioned on the first end piece and projecting in a direction away from the media pack. The handle member is typically non-collapsible, i.e., does not fold or collapse in use, but rather remains projecting from the first end piece. The direction of projection is generally axially away from the media pack, although extension precisely parallel to a central axis is not intended to be meant by this.

The handle member includes a bridge section forming a handle opening thereunder, allowing a portion of a person's hand to pass through the handle member under the bridge section, between the bridge section and adjacent portion the first end piece (i.e., between the bridge section and media pack). The handle member is typically a perimeter handle member positioned adjacent an outer perimeter of the first end piece.

Typically, the handle member is oriented with a handle opening aligned with, and directed toward, a first straight side portion of the non-circular projection, when a D-shaped or other non-circular projection with a straight side portion is present.

In a typical arrangement, the first end piece includes a peripheral rim projection extending in a direction away from the media pack. The peripheral rim projection surrounds a recessed surface portion of the first end piece; the recessed surface portion extending between the peripheral rim projection and the non-circular portion surrounding the central flow aperture arrangement.

The peripheral rim projection typically includes an outer surface with an o-ring retaining groove therein; and, the cartridge includes an o-ring mounted in the retaining groove, as a housing seal arrangement.

Typically, the first end piece includes a portion of a cartridge-to-housing base (or housing base-to-cartridge) rotational alignment indexing arrangement thereon. This portion includes a first radial projection spaced from a locator shoulder to define a first locator gap or receiver space therebetween.

A typical cartridge-to-housing base (or housing base-to-cartridge) rotational alignment indexing arrangement includes a pair of locator gaps or receiver spaces (receivers), each defined by radial projection and a locator shoulder. The locator gaps or receivers are typically spaced, radially, on center, by a radial amount of less than 180°. Also typically radial projections used to define the locator gaps (receiver(s)) include a pair of projections spaced by a smallest radial amount on center, of less than 180°.

The cartridge typically includes a second end piece positioned spaced from the first end piece with the media pack positioned therebetween. The second end piece and the first end piece are typically positioned on opposite ends of a central, tubular, media support that extends through the open interior of the media pack. The first end piece, the second end piece and the tubular support may comprise portions of an integral molded support piece, such as a plastic piece.

The second end piece can include the closed central aperture overlapping and closing the end of the open interior of the media pack; and, an outer perimeter section comprising a plurality of spaced projections and a plurality of drain regions between the spaced projections. The drain regions would be positioned at least in part in direct drain overlap with an end in the media pack, at a location adjacent the second end piece. This provides for a bottom drain arrangement for the cartridge, in use.

Also according to the present disclosure, a crankcase ventilation filter assembly is provided. This assembly may include a cartridge, as previously characterized.

In general terms, the crankcase ventilation filter assembly includes a housing defining an interior including a housing base and a removable access cover. The housing generally includes a gas flow inlet arrangement, a gas flow outlet arrangement and a drain arrangement. Each of the inlet arrangement, outlet arrangement and drain arrangement can be positioned in the housing base.

The housing further includes a first rotational indexing alignment arrangement. The first rotational alignment indexing arrangement generally comprises a cartridge-to-housing base (or housing base-to-cartridge) rotational alignment indexing arrangement.

When the cartridge-to-housing base rotational alignment indexing arrangement is present, the housing base includes a first member of the rotational indexing alignment arrangement and the serviceable filter cartridge includes a second member of the rotational indexing alignment arrangement. The two members are oriented to engage one another, only when the cartridge in a single, selected, rotational orientation within and relative to the housing base, allowing the cartridge to be installed in only the selected rotation orientation.

As an example, the cartridge can include a media pack and a first end piece adjacent a first end of the media pack. The first end piece can include a perimeter housing seal arrangement sealed to a portion of the housing base, and a member of a cartridge-to-housing base rotational indexing arrangement for engagement with a second member of the cartridge-to-housing base rotational indexing arrangement on the housing base. Again the arrangement should be such as to require the cartridge to be at a single selected rotational orientation relative to the housing base, when installed.

An example cartridge-to-housing base rotational alignment indexing arrangement is described which includes at least a first projecting tab, and typically a pair of tabs, on the housing base; and, at least a receiver space, and typically two receiver spacers, formed on the first end piece of the filter cartridge, each receiver space being positioned to receive, therein, a single projection on the housing base only when the cartridge is in the selected, single, rotational orientation relative to the housing base.

Typically, the configuration of the projecting tab(s) and the receiver space(s) is such that the cartridge cannot be fully nested within the housing base, unless the single, selected, rotational orientation between the two is obtained.

In general terms, a crankcase ventilation filter assembly as described includes an access cover which includes a first member of a second (access cover portion-to-cartridge or cartridge-to-access cover portion) rotational alignment indexing alignment arrangement. When the cartridge-to-access cover portion rotational alignment indexing alignment arrangement is present, the access cover includes a first member and the cartridge includes a second member, the first and second members only being engageable when a single, selected, rotational orientation is obtained for the access cover portion to the filter cartridge. In an example, the first member comprises a non-circular projection on the access cover, and the second member comprises a non-circular projection on the first end piece of the cartridge; the two non-circular projections only being engageable in a single, rotational, orientation. In an example described, each non-circular projection has a "D" shaped perimeter definition, comprising a first straight side and a second, opposite, curved side. In a typical arrangement, a non-circular projection on the cartridge is sized to receive, projecting therein, a non-circular projection on the access cover.

Typically the non-circular projection on a cartridge includes a liquid flow gap arrangement therethrough, and is oriented surrounding an open aperture in the first end piece.

In an example shown, surface-to-surface contact between the non-circular projection on the cartridge and the non-circular projection on the access cover is provided, to inhibit air flow therebetween. In general terms, the surface-to-surface contact, provides for a gas flow inhibiting arrangement, which inhibits gas flow between the projection on the cartridge and the projection on the access cover portion, in operation.

In the example arrangement described, the access cover comprises a cover assembly with a regulator valve assembly therein, oriented to regulate gas flow into a central flow aperture of the first end piece. The access cover assembly shown, comprises a cover member and a lower basket member. The regulation valve assembly includes a rolling diaphragm as a valve member positioned between the lower basket member and the cover member.

For an example described, the cover member of the access cover assembly includes a rim member and a cap member, the rim member having a central aperture therethrough and the cap member including a snap-fit projection arrangement projecting through the central aperture of the rim member and into snap-fit engagement with the lower basket member, when the access cover assembly is assembled. When assembled, the rim member, for the example shown, is typically rotatable relative to the gap member and the lower basket member.

In an example arrangement described herein, the access cover assembly includes a third (cap member-to-basket member or basket member-to-cap member) rotational alignment indexing arrangement thereon. This arrangement provides for only a single, selected, rotational alignment between the cap member and the lower basket member, when the access cover assembly is assembled. This cartridge rotational alignment indexing arrangement is shown as comprising for example a projection/receiver arrangement including at least one, and typically more than one, projection in the cap member engageable with a receiver (typically multiple receivers) on the lower basket member only when the cap member and lower basket member are rotationally aligned correctly in a single, selected, rotational orientation, during assembly.

For the example shown, the cap member-to-basket member rotational alignment indexing arrangement includes: snap-fit projections on the cap member engageable with a rim end portion of the basket member having flanges thereon oriented between selected snap-fit projections; and, a pair of projections on the cap member received within a pair of cylindrical receivers on the lower basket member. Alternatives are possible.

It is also characterized herein that a crankcase ventilation filter assembly is provided includes a housing defining an interior having a housing base and a removable access cover, the housing base including a gas flow inlet, a gas flow outlet and a liquid drain outlet; the access cover including a first member of a rotational indexing arrangement therein, which arrangement comprises a cartridge-to-access cover portion (or access cover portion-to-cartridge) rotational alignment indexing arrangement.

The assembly would typically include a serviceable filter cartridge therein, with a media pack and a first end piece. The first end piece would include a second member of the cartridge-to-access cover portion rotational alignment indexing arrangement, requiring the selected portion of the access cover to be in a single selected rotational orientation relative to the cartridge, of the overall assembly configured for use. As an example, a D-shaped projection on the access cover is portion provided in engagement with a D-shaped projection on the cartridge, to provide for a single rotational orientation.

In an example, a D-shaped projection on the access cover portion engages the D-shaped projection on the cartridge in a manner providing for gas flow inhibition therebetween, typically by surface-to-surface contact.

In another aspect of the present disclosure, a crankcase ventilation filter assembly is provided comprising a housing defining an interior and including a housing base and a removable access cover. The housing base includes a gas flow inlet, a gas flow outlet and a liquid flow outlet. The housing base further includes a lower cylindrical portion having a first circular interior cross-section and an upper cylindrical portion of a second circular interior cross-section. The first circular interior cross-section is eccentrically aligned with the second interior cross-section. Typically the lower cylindrical portion includes an upper projection with the first seal surface and the upper cylindrical portion includes a threaded outer surface and an opposite, second, inner seal surface. The access cover is removably threaded onto the upper cylindrical portion with a seal member positioned between a portion of the access cover and the second, opposite, inner seal surface. The housing defines a gas/liquid flow gutter arrangement extending from a location adjacent the inlet at least partially around the housing base, the gas/liquid flow gutter arrangement being positioned between an upper flange of the lower cylindrical portion and the upper cylindrical portion. The gas/liquid flow gutter arrangement includes an upwardly directed ramp section.

In this assembly, a serviceable filter cartridge for use in separating a hydrophobic liquid aerosol phase from a gas stream is perfectly positioned within the housing interior. The cartridge includes a media pack comprising filter media surrounding an open filter interior and including first and second opposite media ends and a first end piece adjacent the first end of the media pack, including a perimeter seal arrangement thereon and a central flow aperture arrangement therethrough. The perimeter housing seal arrangement is sealed to the first seal surface of the housing.

In a typical embodiment, the filter cartridge includes a second end piece positioned spaced from the first end piece with the media pack positioned therebetween. The second end piece includes an outer perimeter section comprising a plurality of drain regions, each drain region being, at least in part, in direct drain overlap with the end of the media and the media pack at a location adjacent the second end piece.

According to a further aspect of the present disclosure, a crankcase ventilation filter assembly is provided comprising a housing defining an interior and including a housing base and a removable access cover. The housing base includes a gas flow inlet, a gas flow outlet and a liquid drain outlet. The housing base includes an upper threaded end. The access cover comprises a cover assembly with a regulator valve assembly therein oriented to regulate gas flow valve into a central flow aperture of a first end piece of an installed cartridge. The access cover assembly includes a cover member and a lower basket member. Regulator valve assembly includes a diaphragm positioned between the cover member and the lower basket, when the cover member is secured to the lower basket.

In an example described, the cover member comprises a rim member and a cap member. The rim member includes a central aperture therethrough and the cap member includes a snap-fit projection arrangement projecting through the central aperture and the rim member and into snap-fit engagement with a lower basket member. In this arrangement, the rim member is typically rotatable relative to the cap member and the lower basket member.

Typically, a serviceable filter cartridge for use in separating a hydrophobic liquid aerosol phase from a gas stream is operably positioned in the housing interior. The cartridge includes a media pack comprising filter media surrounding an open filter interior including first and second opposite media ends and a first end piece adjacent the first end of the media pack including a perimeter housing seal arrangement thereon and a central flow aperture arrangement therethrough. The central flow aperture arrangement is in flow communication with the open filter interior. The perimeter housing seal arrangement is sealed to a portion of the housing base.

What is claimed is:

1. A filter cartridge for use in separating a hydrophobic liquid aerosol phase from a gas stream and for use in filtering the gas stream; the filter cartridge comprising:
    (a) a media pack comprising filtration media surrounding an open interior and including first and second, opposite, ends;
    (b) a first end piece adjacent the first end of the media pack; the first end piece having a first, outer, end surface on an opposite side of the first end piece from the media pack;
        (i) the first end piece including a perimeter housing seal arrangement thereon; the perimeter housing seal arrangement comprising a seal member configured to form a releasable seal with a housing, when the filter cartridge is installed in a housing, for use;
        (ii) the first end piece including a central flow aperture arrangement projecting therethrough in communication with the open interior of the media pack;
        (iii) the first end piece including a rigid peripheral rim projection non-removably positioned thereon and extending in a direction away from the media pack; and,
        (iv) the first end piece having a recessed surface portion extending between the peripheral rim projection and the central flow aperture arrangement; and,
        (v) the first end piece including a non-circular projection positioned around the central flow aperture arrangement and projecting from the first end piece in a direction opposite the media pack;
            (A) the non-circular projection being non-threaded and positioned spaced from the peripheral rim projection by the recessed surface portion;
            (B) the non-circular projection extending to a tip located remote from the recessed surface portion and having a shape with a first straight portion and an opposite curved portion;
            (C) the non-circular projection having a drain gap arrangement therethrough allowing fluid on the recessed surface portion to flow to the central flow aperture arrangement by passage through the non-circular projection; and,
            (D) the cartridge having no threaded mount portion thereon.

2. A filter cartridge according to claim 1 wherein:
    (a) the first end piece includes a first member of a cartridge-to-housing rotational alignment indexing arrangement including at least a first radial projection.

3. A filter cartridge according to claim 2 wherein:
    (a) the first member of a cartridge-to-housing rotational alignment indexing arrangement comprises the first radial projection spaced from a first locator shoulder to define a first locator receiver gap therebetween.

4. A filter cartridge according to claim 3 wherein:
    (a) the first member of a cartridge-to-housing rotational alignment indexing arrangement includes a second radial projection spaced from a second location shoulder to define a second locator receiver gap therebetween.

5. A filter cartridge according to claim 1 including:
    (a) a handle member positioned on the first end piece and projecting in a direction away from the media pack;
        (i) the handle member being a non-collapsible projection and including a handle bridge section forming a handle opening thereunder between the handle bridge section and an adjacent portion of the first end piece.

6. A filter cartridge according to claim 5 wherein:
    (a) the handle member comprises a perimeter handle member positioned adjacent the outer perimeter of the first end piece.

7. A filter cartridge according to claim 1 wherein:
    (a) the second end piece includes: a closed central portion overlapping, and closing, an end of the open interior of the media pack.

8. A filter cartridge according to claim 7 wherein:
    (a) the second end piece includes an outer perimeter section comprising a plurality of spaced projections and a plurality of drain regions between the spaced projections; each drain region being, at least in part, in direct drain overlap with an end of the filtration media in the media pack at a location adjacent the second end piece.

9. A filter cartridge according to claim 1 wherein:
    (a) the second end piece includes an outer perimeter section comprising a plurality of spaced projections and a plurality of drain regions between the spaced projections; each drain region being, at least in part, in direct drain overlap with an end of the filtration media in the media pack at a location adjacent the second end piece.

10. A filter cartridge according to claim 1 wherein:
    (a) the perimeter housing seal comprises an o-ring.

11. A filter cartridge according to claim 1 wherein:
    (a) the first end piece includes a first member of a cartridge-to-housing rotational alignment indexing arrangement comprising a first radial projection spaced from a first locator shoulder to define a first locator receiver gap therebetween;
        (i) the first member of a cartridge-to-housing rotational alignment indexing arrangement also including a second radial projection spaced from a second locator shoulder to define a second locator receiving gap therebetween;
            (A) the first and second locator gaps being radially spaced, on center, a smallest radial amount of less than 180°.

12. A filter cartridge according to claim 1 wherein:

(a) the second end piece and the first end piece are positioned at opposite ends of a central, tubular, media support extending through the open interior of the media pack.

13. A filter cartridge according to claim 12 wherein:

(a) the first end piece, second end piece and tubular media support are portions on a single, integral, molded, support piece.

14. A crankcase ventilation filter assembly comprising:

(a) housing defining an interior and including a housing base and a removable access cover;
  (i) the housing defining a gas flow inlet, a gas flow outlet and a liquid drain outlet; and,
  (ii) the housing base including a first member of a cartridge-to-housing base rotational alignment indexing arrangement thereon; and, (b) a filter cartridge for use in separating a hydrophobic liquid aerosol phase from a gas stream and for use in filtering the gas stream; the filter cartridge comprising:

(a) a media pack comprising filtration media surrounding an open interior and including first and second, opposite, ends;

(b) a first end piece adjacent the first end of the media pack; the first end piece having a first, outer, end surface on an opposite side of the first end piece from the media pack;
  (i) the first end piece including a perimeter housing seal arrangement thereon; the perimeter housing seal arrangement comprising a seal member forming a releasable seal with the housing;
  (ii) the first end piece including a central flow aperture arrangement projecting therethrough in communication with the open interior of the media pack;
  (iii) the first end piece including a rigid peripheral rim projection non-removably positioned thereon and extending in a direction away from the media pack; and,
  (iv) the first end piece including a recessed surface portion extending between the peripheral rim projection and the central flow aperture arrangement;
  (iv) the first end piece having a recessed surface portion extending between the peripheral rim projection and the central flow aperture arrangement; and,
  (v) the first end piece including a non-circular projection positioned around the central flow aperture arrangement and projecting from the first end piece in a direction opposite the media pack;
    (A) the non-circular projection being non-threaded and positioned spaced from the peripheral rim projection by the recessed surface portion;
    (B) the non-circular projection extending to a tip located remote from the recessed surface portion and having a shape with a first straight portion and an opposite curved portion;
    (C) the non-circular projection having a drain gap arrangement therethrough allowing fluid on the recessed surface portion to flow to the central flow aperture arrangement without passage over the non-circular projection; and,
    (D) the cartridge having no threaded mount portion thereon;

(c) the filter cartridge including a second member of a cartridge-to-housing rotational indexing arrangement that is engaged with the filter member of a cartridge-to-housing rotational indexing arrangement, to rotationally orient the cartridge in the housing.

15. A crankcase ventilation filter assembly according to claim 14 wherein:

(a) the second member of the cartridge to housing base rotational alignment indexing arrangement is positioned on the first end piece; and, (b) the housing seal arrangement is a perimeter housing arrangement positioned on the first end piece.

16. A crankcase ventilation filter assembly according to claim 15 wherein:

(a) the first member of the cartridge-to-housing base rotational alignment indexing arrangement includes a first projecting tab on the housing base; and, (b) the second member of the cartridge-to-housing base rotational alignment indexing arrangement includes a first receiver space defined between a first radial projection and a first shoulder oriented on the first end piece of the filter cartridge.

17. A crankcase ventilation filter assembly according to claim 15 wherein:

(a) the first member of the cartridge-to-housing base rotational alignment indexing arrangement includes first and second, spaced, projecting tabs on the housing base; and (b) the second member of the cartridge-to-housing base rotational alignment indexing arrangement includes first and second, spaced, receiver spaces;
  (i) the first receiver space being defined between a first radial projection and a first shoulder oriented on the first end piece of the cartridge; and,
  (ii) the second receiver space being oriented between second radial projection and a second shoulder oriented on the first end piece of the cartridge;
    (A) the first and second receiver spaces being spaced, radially, on center, by a radial spacing of less than 180°.

18. A crankcase ventilation filter assembly according to claim 14 wherein:

(a) the access cover includes a first member of a cartridge-to-access cover portion rotational alignment indexing arrangement thereon; and, (b) the filter cartridge includes a second member of a cartridge-to-access cover portion rotational alignment indexing arrangement thereon;
  (i) the first and second members of the cartridge-to-access cover portion rotational indexing alignment arrangement being engageable to provide a selected, single, rotational alignment between the filter cartridge and a portion of the access cover.

* * * * *